United States Patent
Schenck

(10) Patent No.: US 11,478,691 B2
(45) Date of Patent: Oct. 25, 2022

(54) SNOW SLIDING DEVICE INCORPORATING MATERIAL HAVING SHEAR-RATE DEPENDENT SHEAR RESISTANCE, AND METHODS FOR ITS MANUFACTURE

(71) Applicant: Renoun, LLC, Shelburne, VT (US)

(72) Inventor: Cyrus K Schenck, Burlington, VT (US)

(73) Assignee: Renoun, LLC, Shelburne, VT (US)

(*) Notice: Subject to any disclaimer, the term of this patent is extended or adjusted under 35 U.S.C. 154(b) by 399 days.

(21) Appl. No.: 16/507,229

(22) Filed: Jul. 10, 2019

(65) Prior Publication Data
US 2020/0016475 A1  Jan. 16, 2020

Related U.S. Application Data

(60) Provisional application No. 62/696,187, filed on Jul. 10, 2018.

(51) Int. Cl.
| | |
|---|---|
| *A63C 5/12* | (2006.01) |
| *B32B 7/08* | (2019.01) |
| *B29C 65/56* | (2006.01) |
| *B29L 31/52* | (2006.01) |

(52) U.S. Cl.
CPC ............ *A63C 5/126* (2013.01); *B29C 65/562* (2013.01); *B32B 7/08* (2013.01); *B29L 2031/5263* (2013.01)

(58) Field of Classification Search
CPC ......... A63C 5/126; B29C 65/562; B32B 7/08; B32B 38/0004
See application file for complete search history.

(56) References Cited

U.S. PATENT DOCUMENTS

| | | | |
|---|---|---|---|
| 4,590,023 A | 5/1986 | Hayashi et al. | |
| 5,035,442 A | 7/1991 | Arnsteiner | |
| 5,217,243 A | 6/1993 | Recher et al. | |
| 5,759,664 A | 6/1998 | Chisnell et al. | |
| 6,349,961 B1 * | 2/2002 | Colley | B29C 45/14467 280/14.22 |
| 6,851,699 B2 * | 2/2005 | DeRocco | A63C 5/052 280/608 |
| 2009/0191989 A1 | 7/2009 | Lammer et al. | |
| 2015/0335985 A1 | 11/2015 | Schenck et al. | |
| 2017/0113120 A1 | 4/2017 | Hill et al. | |

OTHER PUBLICATIONS

PCT/US20/39398, International Search Report, dated Sep. 16, 2020.

* cited by examiner

*Primary Examiner* — George R Koch
*Assistant Examiner* — Christopher C Caillouet
(74) *Attorney, Agent, or Firm* — Caldwell Intellectual Property Law

(57) ABSTRACT

A method of manufacturing a snow sliding device includes forming a core by forming a core body including an outer surface including an upper surface, a lower surface, and a first thickness, and shaping the core body to include a second thickness; providing a plurality of elements, including a base with a sliding surface, and a top surface; incorporating in at least one of the core and the plurality of elements a first material, the first material exhibiting a shear rate-dependent shear resistance; and laminating the plurality of elements to the core.

22 Claims, 10 Drawing Sheets

SNOW SLIDING DEVICE INCORPORATING MATERIAL HAVING SHEAR-RATE DEPENDENT SHEAR RESISTANCE, AND METHODS FOR ITS MANUFACTURE

CROSS-REFERENCE TO RELATED APPLICATIONS

This application claims priority to Provisional Application No. 62/696,187 filed on Jul. 10, 2018 and entitled "SNOW SLIDING DEVICES INCORPORATING MATERIAL HAVING SHEAR-RATE DEPENDENT SHEAR RESISTANCE, AND METHODS FOR ITS MANUFACTURE" the entirety of which is incorporated herein by reference.

FIELD OF THE INVENTION

The present invention generally relates to the field of snow sliding devices and manufacture thereof. In particular, the present invention is directed to a snow sliding devices incorporating material having shear-rate dependent shear resistance, and methods for its manufacture.

BACKGROUND

Snow sliding devices such as skis and snowboards are constructed to meet several design goals, including giving a user control of the devices' movements over snowy surfaces, limiting vibration or "chatter" of the devices as they slide, rigidity, flexibility, and durability. Unfortunately, existing methods for constructing snow sliding devices do not have an effective way to account for the variability of conditions in which such devices may be used, or to control vibration adequately under more difficult conditions.

SUMMARY OF THE DISCLOSURE

In one aspect, a method of manufacturing a snow sliding device includes forming a core. Forming the core further includes forming a core body including an outer surface including an upper surface and a lower surface, the core body including a first thickness defining a first vertical distance from at least a first point on the upper surface to a corresponding at least a first point the lower surface. Forming the core further includes shaping the core body to include the first thickness and a second thickness, the second thickness defining a second vertical distance from at least a second point on the upper surface to a corresponding at least a second point on the lower surface. The method includes providing a plurality of elements, including a base having a sliding surface and a top surface. The method includes incorporating in at least one of the core and the plurality of elements a first material, the first material exhibiting a shear rate-dependent shear resistance. The method includes combining the plurality of elements with the core.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
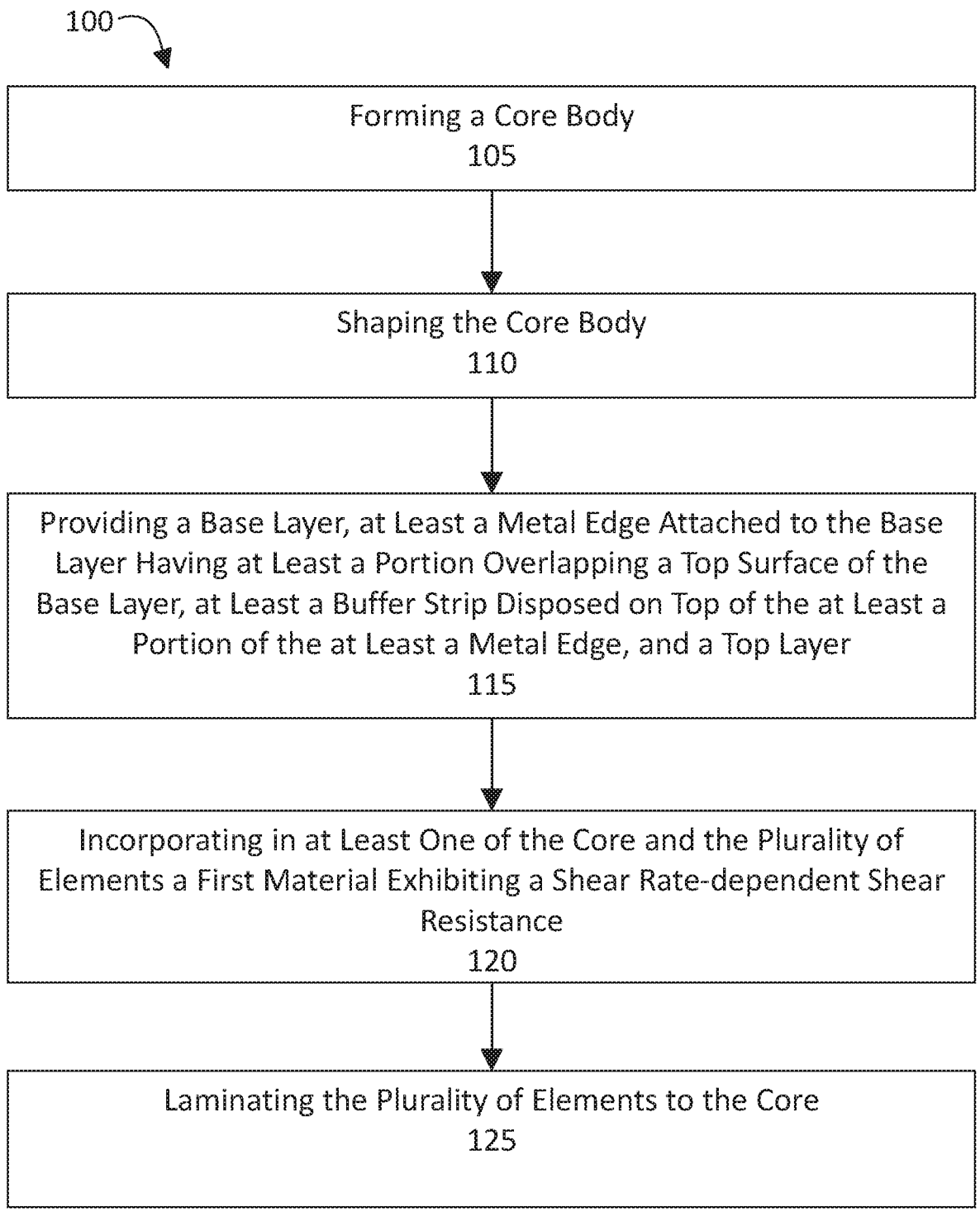
FIG. 1 is a flowchart illustrating an exemplary embodiment of a method for manufacturing snow sliding device.

In an embodiment, this disclosure is directed to manufacturing a snow sliding device, such as a ski or snowboard, to include a material exhibiting shear rate-dependent shear resistance. The material, which may be non-Newtonian, may be incorporated in any of various elements of snow sliding device, either integrally or by insertion in voids within the device. The snow sliding device is shaped and laminated together. The resulting snow sliding device exhibits greater vibration control, durability, and flexibility than existing snow sliding devices.

Non-Newtonian materials have properties that distinguish them from other materials. As used herein, non-Newtonian materials are materials having a shear response that varies by shear rate. When subjected to an increase rate of shear deformation, non-Newtonian materials undergo a change in apparent rigidity and/or apparent viscosity. Non-Newtonian materials as described herein may belong to one of two general classifications: (1) non-Newtonian materials classified as pseudoplastic or shear-thinning materials demonstrate decreased apparent rigidity and/or apparent viscosity in response to an increasing shear rate; and (2) non-Newtonian materials classified as dilatant or shear-thickening materials demonstrate increased apparent rigidity and/or apparent viscosity in response to an increasing shear rate. For example, a dilatant material may behave like low viscosity fluid under small or absent shear deformation but behave as a highly viscous fluid under higher rates of shear deformation. Other dilatant materials may behave as a solid or quasi-solid material when subjected to high rates of shear deformation, while behaving as a low-viscosity fluid under low or absent shear deformation. Still other dilatant materials may behave as flexible or elastomeric solids or quasi-solids when subjected to little or no shear deformation, but as highly rigid solids under high shear deformation rates.

The normal or resting condition of a non-Newtonian material (i.e., the condition where the non-Newtonian material is experiencing little or no shear deformation) and the opposite or ending point where the non-Newtonian material is subjected to a high rate of shear deformation may define the endpoints of a portion of a spectrum; one end of the spectrum may be described as "fluidity," while the other may represent "rigidity." Some non-Newtonian materials may cover the full range of the spectrum, while others may cover only part of the spectrum. For instance, a non-fluid non-Newtonian material may range from soft, elastic or flexible at one extreme along the spectrum to a rigid solid at the other end, but may not arrive at a fluid or apparently fluid form, at least in the temperature range in which it is tested; the non-fluid non-Newtonian material in this example may still be defined as lying on the spectrum, as its softer extreme is closer in form to fluid than its more rigid extreme. Adjustment of forces that act on a non-Newtonian material, the types of ingredients in the non-Newtonian material, or the quantities of ingredients in the non-Newtonian material may shift the region on the spectrum represented by the non-Newtonian material toward the rigid or fluid end of the spectrum, or increase or decrease the span of the region on the spectrum for that material. As an example, a dilatant material subjected to a high rate of shear deformation may be driven in the direction of rigidity on the spectrum, while cessation of the shear deformation may drive the material toward fluidity.

As movement along the spectrum is affected by shear rate, the timescale over which shear force is applied to a non-Newtonian material may affect its movement along the spectrum. For instance, a gradually applied shear force to a dilatant material may result in a small or negligible increase in viscosity or rigidity, while a shear force applied rapidly may result in a drastic increase in viscosity or rigidity. As an example, a dilatant suspension of cornstarch in water, sometimes known as "Oobleck," may support a person stepping rapidly or "dancing" on its surface, while allowing a person who stands or walks slowly on the surface to sink into the material; the opposite effect is observed in water-impregnated "quick-sand," which demonstrates pseudoplastic properties, causing a swimmer trapped in the quicksand to sink faster when struggling harder. Timescale limits under which non-Newtonian behavior is observable may depend upon various factors, including characteristics of the force applied to the material, and the type of non-Newtonian material involved.

Non-Newtonian materials may be modeled according to a "power law," wherein the apparent viscosity of the material, defined as viscosity in liquids or more generally viscosity-like resistance to shear forces, is characterized by the equation $\eta = K\dot{\gamma}^{n-1}$, where $\eta$ is the apparent viscosity of the material, K is a positive material-specific constant, and $\dot{\gamma}$ is the applied shear rate. Where n is less than 1, the material represented in the equation is pseudoplastic, and the apparent viscosity of the material is proportional to a negative power of the applied shear rate. Where n is greater than 1, the material represented in the equation is dilatant, and the apparent viscosity of the material is proportional to a positive power of the applied shear rate. Note that the positive power may be a non-constant positive power; that is, the positive power may be approximately constant or may vary while still exceeding zero. For instance, (n−1) may vary between 0.5 and 3, but remain greater than zero, and still be considered a positive power for the purposes herein. Similar variations may be observed with regard to negative powers. Persons skilled in the art will also be aware that material properties of any material can be described by a single equation only within a limited range of parameters, and that a property described for a material is described for the material as subjected to parameters of typical use; thus, for instance, a dilatant material used in a snow-sliding apparatus is a material exhibiting shear-thickening behavior within the range of temperatures and forces to which that form of snow-sliding apparatus is subjected during intended use, i.e. during motion through or navigation through the range of forces and impacts presented by bodies of water. Similarly, a material described as elastic is a material that behaves in an elastic manner within the intended range of temperatures and forces, and, for instance, may become rigid at very low temperatures, fluid at very high temperatures, and unable to rebound from excessive forces.

A Newtonian material, in contrast to non-Newtonian materials as described above, is a material whose shear resistance may be modeled as constant, or essentially constant, over a range of conditions corresponding to its typical or intended use. Thus, as used in this disclosure a material is not non-Newtonian if its shear resistance is apparently constant under shear rates that may occur when such material is used as a component of a snow-sliding apparatus as described in this disclosure, even if the material may be shown to evince a slight variation in shear resistance based on shear rate; if for the purposes of its us in a snow-sliding apparatus the variation in shear resistance is small enough that the relationship appears constant without advanced testing equipment, the material is not non-Newtonian. Similarly, a material having essentially constant shear resistance across shear rates as measured in use consistent with a snow-sliding apparatus is not a non-Newtonian material for purposes herein, even if under significantly different temperatures, pressures, or other physical effects the material may be induced to behave in a non-Newtonian manner. As a non-limiting example, a plastic material that has been melted to the point where it behaves as a liquid may exhibit non-Newtonian responses at low shear rates, but may not exhibit non-Newtonian responses when in a solid form; this material would not be non-Newtonian, for purposes herein, if the material were solid at pressures and temperatures experienced during use in a snow-sliding apparatus.

Various mechanisms may cause dilatant behavior in a material, independently or in combination. In shear-induced ordering, alignment of particles in the dilatant material may increase as a shearing force is applied; increasingly aligned particles may behave in an increasingly rigid manner. In addition, or alternatively, particles within the dilatant material maybe ordered at low shear rates, and become increasingly disordered at higher shear rates, resulting in greater apparent viscosity or rigidity. Another factor which may contribute to dilatant behavior may be change in volume of one or more ingredients, such as molecules whose volume expands under shear forces; this increase in volume may increase apparent rigidity or viscosity of dilatant material. Another factor which may increase apparent rigidity and/or apparent viscosity in dilatant material may be friction between particles that increases with increased shear rate, inhibiting movement of particles past each other. An additional factor that may increase apparent viscosity or apparent rigidity with increased shear rate may be attraction between molecules that increases with application of shear force. Another factor that may cause dilatant behavior may be a shear force overcoming repulsive forces between particles, allowing them to clump together. In suspensions of particles in liquids or gels, increases in shear rate may cause micro assembly clusters that increase resistance to shear and viscosity.

An additional factor that may cause dilatant behavior may be observed in certain polymeric materials, wherein shear-induced crosslinking between molecular elements may increase viscosity and/or resistance to shear force. Another factor that may contribute to dilatant behavior may be the formation of shear-induced non-Gauss chains in polymeric materials. An additional factor that may contribute to dilatant behavior in polymeric materials may be the formation of space network structure in response to shear rate increases. It should be understood that the above list of interactions and mechanisms is not intended to be exhaustive, and that shear thickening behavior may be the result of any phenomenon or interaction, or combination of phenomena or interactions including those listed above and any others, as would be apparent to one skilled in the art. A non-limiting example of a dilatant polymer material is polyborodimethylsiloxane and chemical and physical analogs thereof.

In some embodiments, decrease in shear rate, for instance by reduction or removal of shearing force, may have the opposite effect in non-Newtonian material of increasing shear rate. For example, a dilatant material under a high shearing force may be apparently solid or viscous and may become increasingly soft or fluid as the shearing force is reduced or removed. A pseudoplastic material may become increasingly stiff or viscous as a shearing force is reduced or removed.

Several categories of non-Newtonian materials will now be described. It should be understood that this list is not intended to be exhaustive, and any suitable types of dilatant material are contemplated for use in the disclosed embodiments.

Non-Newtonian materials may include dilatant fluids. A dilatant fluid may possess the characteristics of a fluid until it encounters a shear force, whereupon the dilatant fluid will thicken (e.g., move toward rigidity), and behave more like a higher viscosity fluid, quasi-solid, or solid. The shear force may be supplied by any suitable form of agitation, including without limitation direct or indirect impact of an object against the dilatant fluid. The dilatant fluid may return to a lower-viscosity or more liquid state upon cessation or reduction of the shear force. Dilatant fluid may include a colloid, composed of suspended particles in a liquid medium. A non-limiting example of a liquid medium may be polyethylene glycol; a non-limiting example of particles suspended in the liquid medium may be silica particles. Any suitable medium or particles may be used. In the absence of shear force, or when being acted on by shear forces applied slowly, the particles may float freely in the liquid medium without clumping or settling, owing to a slight mutual repulsion between the particles. An increase in shear rate, for instance due to a sudden impact, may overcome the repulsion, allowing the particles to clump together, increasing viscosity or apparently solid properties. When the shear rate decreases, the repulsion may push the clumps apart, causing fluid-like behavior again. Dilatant fluids may be used to make films, resins, finishes, and coatings that exhibit dilatant behavior. Persons skilled in the art will be familiar with methods used to make films, finishes, and coatings using fluids.

Conversely, a pseudoplastic fluid may possess the characteristics of a higher-viscosity fluid, solid, or quasi-solid until it encounters a shear force, whereupon the pseudoplastic fluid will thin (e.g., move away from rigidity), and behave more like a lower viscosity fluid, or softer solid or quasi-solid. These types of non-Newtonian fluids may be incorporated in adhesives, such as glue or epoxy. Persons skilled in the art will be familiar with methods used to make films, finishes, and coatings using fluids.

Non-Newtonian materials may include dilatant gels. Dilatant gels may have the characteristics of high-viscosity fluids, quasi-solids, or intermediate forms. Such non-Newtonian gels may have a similar composition to non-Newtonian fluids but may exhibit higher apparent viscosity or rigidity. In some embodiments, dilatant gels have the same ingredients as non-Newtonian fluids but may exist in a gel form due to one or more of various factors, including additional ingredients that cause the liquid medium to become gelatinous or environmental conditions. Non-Newtonian gels may exhibit similar qualities to jellies, putties, or clays. At low or absent shear rates, dilatant gels may be deformed with application of little or no force, while at higher shear rates such as those resultant from the energy of a sudden impact, dilatant gels may become increasingly rigid, with an improving resistance to deformation. The mechanisms that cause dilatant behavior in other dilatant materials may cause dilatant behavior in dilatant gels. On the other hand, pseudoplastic gels may be rigid at low or absent shear rates, with a strong resistance to deformation, while at higher shear rates may be more readily deformed. The mechanisms that cause pseudoplastic behavior in other pseudoplastic materials may cause pseudoplastic behavior in pseudoplastic gels.

Dilatant fluids or gels may be encapsulated to produce another non-Newtonian material. Encapsulated dilatant fluids or gels may include containers filled with dilatant fluids or gels. Containers may include one or more flexible or rigid walls; walls may also be constructed wholly or in part of such non-Newtonian material. Containers may be designed to receive vibrations or impact forces and transmit the vibrations or impact forces to the dilatant fluid or gels. The resulting increase in viscosity or rigidity of enclosed dilatant fluids or gels may cause the apparent rigidity of the containers to increase, while the enclosed pseudoplastic fluids or gels may respond with a decrease in apparent rigidity.

Dilatant foams are another kind of non-Newtonian material. Dilatant foam may be formed by confining physically or chemically produced bubbles of gas in dilatant gel or fluid. The resulting material may be solidified. Dilatant foam may have similar behavior to other non-Newtonian materials; for instance, increased shear rate caused by a sudden impact or other event may cause dilatant foam to become more rigid, while under reduced shear rates the dilatant foam may be softer or more flexible, and pseudoplastic foams may exhibit an inverse response as described above.

Dilatant solids are another category of non-Newtonian materials. Dilatant solids may be produced by solidifying non-Newtonian gels or fluids, or by introducing dilatant material into solid objects. Processes such as extrusion or injection molding may be used to dilatant solids. Such non-Newtonian solids may exhibit similar behavior to other non-Newtonian materials; for instance a dilatant solid may be relatively flexible or elastic under lower shear rates but may be more rigid or hard when subjected to high shear rates, such as those resultant from a sudden impact. Similar mechanisms to those causing shear thickening in other dilatant materials may produce shear-thickening behavior in dilatant solids.

An additional kind of non-Newtonian material includes dilatant filaments. A dilatant filament may be formed by any suitable processes, or combination of processes, including, for example, injection molding, extrusion, or spinning out of a melt. The dilatant filament may exhibit the characteristics of a dilatant solid.

An additional kind of non-Newtonian material includes impregnated fibers. An impregnated fiber may include, for example, a fiber or yarn that has absorbed, and/or is coated with, a dilatant material. The fiber may include a high strength polymeric fiber. Such non-Newtonian material may be a fluid and may retain its fluid characteristics after impregnation. This may help to ensure that the impregnated fiber will remain flexible, while endowing the fiber with non-Newtonian properties. Non-Newtonian-impregnated fibers and non-Newtonian filaments may be used in combination with or in lieu of any other fiber in any textile, endowing the textile with the non-Newtonian properties of the fibers and/or filaments, in combination with any additional properties of the textile.

An additional kind of non-Newtonian material includes impregnated fiber reinforced materials. An impregnated fiber reinforced material may include, for example, a fabric that has absorbed, and/or is coated with, a dilatant material. Additionally or alternatively, the impregnated fiber reinforced material may include previously impregnated fibers woven together to form a fabric. It is also contemplated that the impregnated fiber reinforced material may include a fabric made by weaving together non-Newtonian filaments and/or impregnated fibers. It is further contemplated that the fabric or fibers may be set into another medium to reinforce that medium. It is also contemplated that dilatant materials may be mixed in with the medium to impart non-Newtonian properties to the medium.

The impregnated fiber reinforced material may exhibit dilatant behaviors, similar to those described above with respect to the other categories of dilatant materials. For example, the coefficient of friction between the fibers, and/or between the fibers and the medium, may increase during an impact event, causing the fibers and/or medium to become more rigid, resulting in dilatant behavior. It is further contemplated that the fibers may form a substrate that, when a dilatant material permeates the fibers, holds particles of the dilatant material in place. When an object suddenly strikes the impregnated fiber reinforced material, the dilatant material will immediately thicken or harden, imparting its hardness to the overall construction. The flexibility of the overall construction will return upon removal of the force. Similarly, fibers of a fiber-reinforced material incorporating pseudoplastic material may act as a substrate retaining the pseudoplastic material at high shear rates, where the flexibility or elasticity of the fiber-reinforce material will increase in response to the high shear rates.

Non-Newtonian textile represents another category of non-Newtonian material. A non-Newtonian textile may be formed using any non-Newtonian fibers, non-Newtonian fiber-reinforced materials, or fibers impregnated with non-Newtonian material. Fibers or fiber-reinforced material may be formed into non-Newtonian textile by any suitable process for combining fibers or fiber-reinforced materials into textiles, including without limitation weaving fibers or fiber-reinforced materials and matting fibers or fiber-reinforced materials.

An additional kind of non-Newtonian material includes dilatant composites. A dilatant composite may include, for example, a solid foamed synthetic polymer. The solid foamed synthetic polymer may include an elastic, and/or an elastomeric matrix. The elastomeric matrix may retain its own boundaries without need of a container. The composite may also include a polymer-based non-Newtonian different from the solid foamed synthetic polymer. The polymer-based dilatant may be distributed through the matrix and incorporated therein during manufacture. The composite may also include a fluid distributed through the matrix. The combination of the matrix, non-Newtonian, and fluid may be selected such that the composite may be resiliently compressible (i.e., display resistance to compressive set), and preferably also flexible.

Another dilatant composite may include a solid, closed cell foam matrix and a polymer-based non-Newtonian, different from the matrix, distributed through the matrix. The composite may also include a fluid distributed through the matrix. The combination of matrix, dilatant, and fluid may be selected such that the composite may be resiliently compressible.

In either of the dilatant composites described above, any suitable solid materials may be used as the matrix, including, for example, elastomers. This may include natural elastomers, as well as synthetic elastomers, including synthetic thermoplastic elastomers. These may include elastomeric polyurethanes, silicone rubbers, and ethylene-propylene rubbers. Any polymer-based non-Newtonian that may be incorporated into the matrix may be used in the dilatant composites. The for instance, a dilatant polymer may be selected from silicone polymer-based materials, such as borated silicone polymers. The dilatant may be combined with other components in addition to the components providing the non-Newtonian behavior, including, for example, fillers, plasticisers, colorants, lubricants and thinners. The fillers may be particulates (including microspheres), fibrous, or a mixture of the two. It is contemplated that a borated siloxane-based material may be used as a dilatant.

An additional kind of non-Newtonian material includes dilatant layers. A non-Newtonian layer may include a layer of material formed from one of, or a combination of, the above categories of non-Newtonian materials. The non-Newtonian layer may be combined with layers having other properties, such that the combined layers may exhibit some form of non-Newtonian behavior as a result.

The use of the terms "non-Newtonian materials," "pseudoplastic materials," and/or "dilatant materials" in the following description of snow-sliding apparatuses is meant to cover all categories of non-Newtonian, pseudoplastic, and/or dilatant materials known to those skilled in the art, including without limitation the categories and examples of non-Newtonian, pseudoplastic, and/or dilatant materials described herein.

Some embodiments described herein are directed to snow-sliding apparatuses, and methods for manufacture of snow-sliding apparatuses. As defined herein, a snow-sliding apparatus is a recreational device used by a person to traverse snowy surfaces by sliding on a substantially flat bottom surface. A snowy surface, as used in this disclosure, is a surface formed by the deposition of ice crystals and agglomerations of ice crystals on a solid substrate such as ground, frozen water, human-made surfaces, and the like. The snowy surface may be formed by natural precipitation of snow, sleet, freezing rain, and other precipitation depositing frozen water or freezing water in any forms or combinations. Snow may be deposited using artificial means, such as snow-producing machines commonly used on alpine and cross-country ski trails. A snowy surface may have crusts or layers of ice, compacted snow, fluffy or powered snow, nodules of ice, snow that has melted and refrozen one or more times to form granules of ice, and the like. A snowy surface may be groomed, where grooming is a process performed by humans, machines, or combinations thereof to make the snowy surface more suitable for one or more forms of snow-sliding or other recreation. Grooming may include, without limitation, grading or leveling, compacting, raking, forming into topographical features such as moguls, ramps, jumps, half-pipes, and the like. A snowy surface may be ungroomed, or "natural," as well, where an ungroomed surface is a surface formed solely by deposition of precipitation, natural processes affecting deposited precipitation (for instance, drifting because of wind, melting and thawing, avalanches, or the like), and the passage of snow-sliding apparatuses as the surface is used for recreational purposes; a snowy surface may also be formed by a grooming-like process that emulates the conditions of a natural surface. A snowy surface may also include artificial surfaces created to imitate one or more characteristics of snowy surfaces as described above, using a combination of manufactured elements including textiles, polymers, and the like.

Particular features and forms of snow-sliding devices in various embodiments will be illustrated below. A snow-sliding device typically includes a base surface that slides on top of the snowy surface. The base surface is typically designed to slide on the snowy surface with low friction; the base surface may also include higher-friction zones or elements to grip the snowy surface and propel the snow-sliding device over the snowy surface. A snow-sliding device may include a device to secure one or more feet of a user to the snow-sliding device; devices may include "bindings" that engage specialized or generic footwear. Snow-sliding devices may include without limitation cross-country skis, skate skis, downhill or "alpine" skis of any type, telemark skis, and snowboards.

Figure 2A:
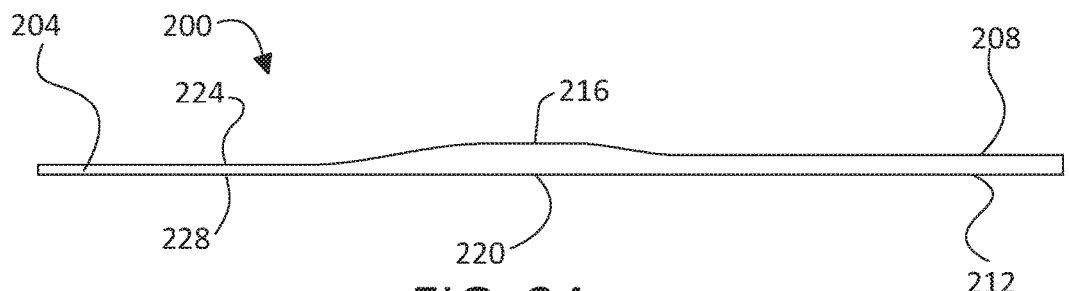
FIG. 2A is a schematic drawing illustrating an exemplary core in an embodiment.

Turning now to FIG. 1, an exemplary embodiment of a method 100 of manufacturing a snow sliding device is illustrated. At step 105, a core is formed. An exemplary embodiment of a core 200, as seen from one side, is illustrated in FIG. 2A. Forming core 200 may include forming a core body 204. Core body 204 may be composed of any suitable material or combination of materials, including without limitation wood such as maple, ash, beech, poplar, okume, or other wood, plywood, fiberglass, laminated fiberglass, metal such as steel, titanium, aluminum, combinations of metals, or alloys of metals, composite honeycomb, foam, resin, carbon fiber, graphene, polyurethane, polyethylene, epoxy, or any other material combination usable to provide desired material properties to the core 200. Core body 204 may include an upper surface 208 and lower surface 212, which represent surfaces nearer to, respectively, a sliding surface and a surface on which a user stands. Core body 204 has a first thickness defining a first vertical distance from at least a first point 216 on the upper surface 208 to a corresponding at least a first point 220 on the lower surface 212.

At step 110, and still referring to FIG. 1, forming core 200 includes shaping core body 204 to include the first thickness and a second thickness, the second thickness defining a second vertical distance from at least a second point 224 on the upper surface to a corresponding at least a second point 228 on the lower surface, as illustrated in FIG. 2A. Second thickness may be less than first thickness: for example, first thickness may be a thickness at or near a point where a user stands on the snow-sliding device, which may be a point where there are bindings, for instance. Second thickness may be a thickness of a forward section of core 200, where a thinner construction for snow-sliding device is desired to permit some degree of flexibility. Core body 204 may be further shaped to include a third thickness, which may, for instance, be a thickness of a rearward section of core 200. Third thickness may be larger or smaller than second thickness. Third thickness may be greater or lesser than first thickness. As a non-limiting example, traversing core body 204 from front to back, a front section of second thickness may widen to a middle section of first thickness, and then taper down to a rear section of third thickness, which is slightly thicker than the front section.

In reference to FIG. 2A, forming the core body 204 may be performed in the same process as shaping the core body 204, or in a different process. In one embodiment, core body 204 may be formed using molding, such as injection molding; for instance, a mold having the shape of core body 204 may be prepared and filled with a liquified resin or metal, or a froth that is then cured or allowed to harden into resin, metal or foam. Curing may be performed by modifications of temperature of the mold contents, by passage of time, by exposure to additional chemicals, by exposure to air, or by irradiation including but not limited to irradiation with ultraviolet radiation. Core body 204 may then be removed or extracted from the mold. Shaping the core body 204 may be accomplished by the shape of the mold; that is, upon extraction of the core body 204 from the mold, core body 204 may already have first and second thicknesses. Core body 204 may be subjected to additional shaping after extraction, for instance by machining, shaving, or otherwise removing material to further shape core body 204; additional steps may alternatively include addition of material to core body 204 by additive means as described below, impregnation of core body 204 with one or more materials, sealing of an exterior surface of core body 204, lamination of one or more exterior layers to core body 204, or the like. As further non-limiting example, core body 204 may be initially formed as a hollow body, for instance using blow-molding or additive manufacture, and then filled with additional material, including without limitation resin, gel, foam, liquid, epoxy, or other material.

With continued reference to FIG. 2A, core body 204 may be formed by subtractive manufacturing. As used herein, subtractive manufacturing is any process that creates a part or product, such as core body 204, by removal of material from a previously existent object, which may have any shape. Subtractive manufacturing may be performed manually, for instance by cutting, sawing, or rasping material. Subtractive manufacturing may be mechanized, defined herein as performed using a device that restricts material-removal tools to one or more specific degrees of freedom, such as sliding or rotary motions; a non-limiting example is a lathe, a plane or knife constrained to a track, or a saw that slides or has material slid past on a track. A further example is a milling machine tool, which may include one or more rotary tools for material removal and one or more slides or other items for moving the one or more rotary tools relative to the object from which material is to be removed. Subtractive manufacturing may be performed using an automated manufacturing device, which may be any device that is controlled by an automated process; automated manufacturing device may be controlled by a logic circuit including one or more logic gates, by a finite state machine, a processor using Vonn Neumann or Harvard architecture with reference to a digital storage memory, a computer or computing device, a microprocessor, an analog circuit responding to one or more feedback systems, a mechanized automated system, any control system, or the like. As a non-limiting example, automated manufacturing device may include a computer numerical control (CNC) machine.

As shown for illustrative purposes in FIG. 2A, a core blank 232 may be provided, which may be composed of any material or combination of materials suitable for construction of core body 204 as described above. Core blank 232 may be initially formed by cutting or machining core blank 232 from a larger block of material. As a non-limiting example, a machine tool such as a CNC machine or hand-operated machine tool including one or more cutting or material-removal tools, which may be powered or static tools (including without limitation a drag-knife), may be used or operated to cut out an exterior outline of core, examples whereof may be seen in figures provided below. A user may cut or saw core blank from block of material. Core blank 232 or block of material may be formed by other processes including without limitation molding, additive manufacture, subtractive manufacturing, or any other process usable to produce a block of material. Core body 204 may be shaped from core blank 232 using any subtractive process described above, including without limitation sanding or other material removal in a CNC machine. Core blank 232 and/or block of material may be received from a third-party provider or manufactured as part of method 100.

Still referring to FIG. 2A, core body 204 may be formed by an additive manufacturing process. An additive manufacturing process, as used herein, is a process of forming a part or product by successive deposition of layers or other quanta of material. Additive processes may include, without limitation, stereolithography, rapid prototyping and/or "3D printing" of any description, powder deposition and fixing processes such as deposition of power and binding, laser sintering, and the like, lamination of successive layers of material that is then cured or allowed to dry, controlled deposition of molten material that cures or dries, or any other process involving successive deposition of material. Layers may be deposited on top of a base or around a core. Additive manufacturing may be manual, mechanized, or automated as described above, including without limitation additive manufacturing using a rapid prototyping device controlled by a processor-based system such as a computer or microcontroller.

Figure 3:
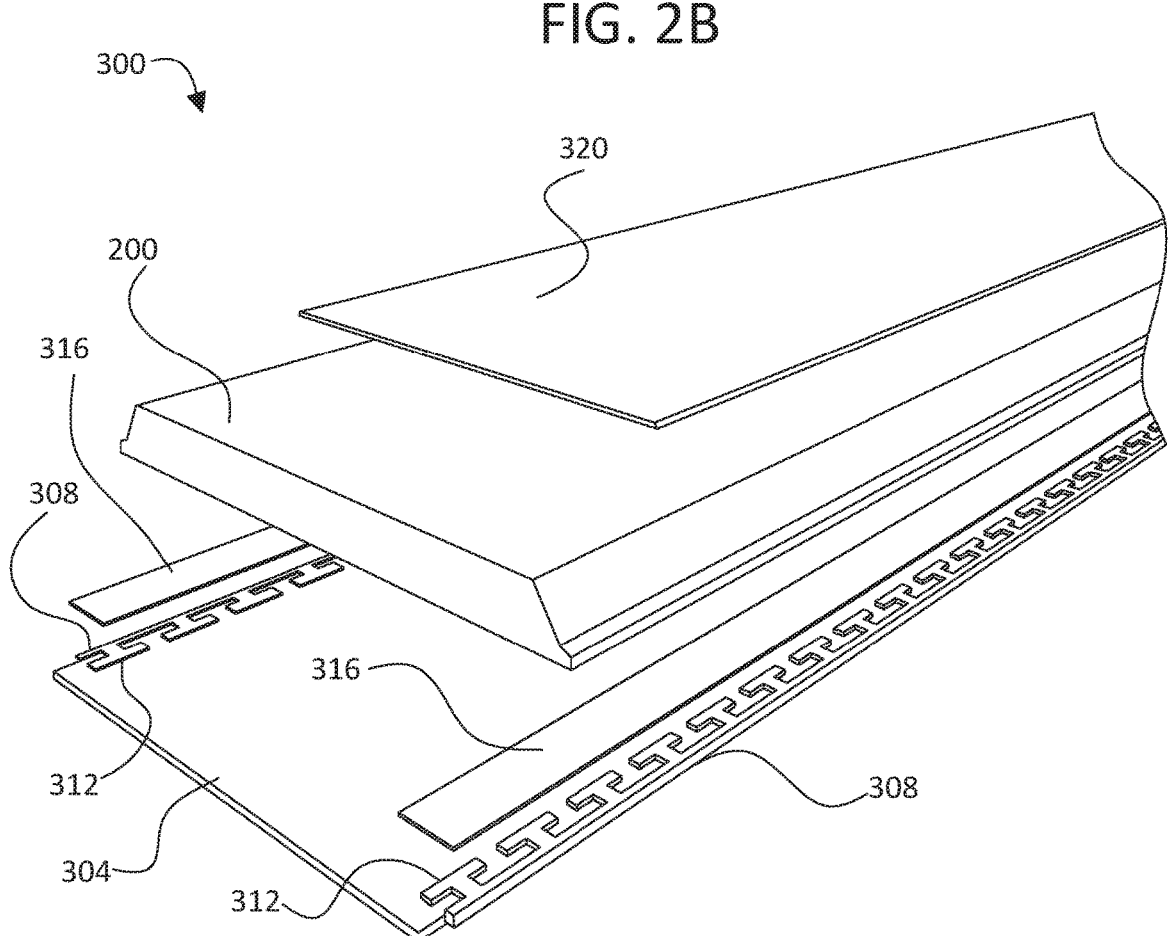
FIG. 3 is a cutaway perspective exploded view illustrating a portion of an exemplary snow sliding device in an embodiment.

Referring back to FIG. 1, at step 115, a plurality of elements is provided; providing as used herein may include manufacturing, receiving from other sources such as a third-party provider, or a combination thereof. FIG. 3 illustrates an exploded view of a portion of snow sliding device 300 including core 200 and plurality of elements. Plurality of elements may include a base 304. Base 304 may be a layer having a lower surface that contacts snowy surface when snow-sliding device 300 is in use. Base 304 may be a portion of core 200; that is, base 304 and core 200 may form a monolithic whole, of which the base 304 forms a lower portion. Base 304 may be constructed of any material or materials suitable for sliding over snow, including without limitation porous, plastic material saturated with a wax to produce a fast-sliding, low friction surface. Base may be manufactured by any suitable process described above, including without limitation by cutting or otherwise subtractively manufacturing base 304 from a sheet or block of material. Plurality of elements may include at least a metal edge 308 attached to the base layer. At least a metal edge 308 may provide snow-sliding device 300 with an edge that a user can dig into a snowy surface to execute turns or otherwise control descent of slopes on the snow-sliding device 300. At least a metal edge may include at least a portion 312 overlapping a top surface of the base 304; in an embodiment, at least a portion 312 may allow metal edge to be adhered securely to base 304, permitting metal edge 308 to endure significant shear strain without detaching from snow sliding device 300. Metal edge 304 may be formed using any manufacturing process, including without limitation machining. At least a metal edge 304 may include a metal edge disposed at each lateral side of base 304.

With further reference to FIG. 3, a plurality of elements may include an at least a buffer strip 316 disposed on top of the at least a portion of the at least a metal edge 304. At least a buffer strip 316 may be a strip of material that connects at least a portion to the layer above it, permitting adhesion that is capable of withstanding shear stresses. At least a buffer strip 316 may be composed of any suitable material, including elastomeric material. Plurality of elements may include a top surface 320. Top surface 320 may be a layer of material that forms a top surface of snow sliding device 300. Top surface 320 may be an integral portion of core 200; for instance, top surface 320 and core 200 may be a monolithic whole, of which top surface 320 makes up the upper surface, or the surface opposite the sliding surface of base 304. Top surface 320 may be composed of any material or combination of material suitable for the composition of any element previously mentioned herein. Top surface 320 may be manufactured from a sheet or strip or polymer material. Top surface 320 may act to seal other elements against moisture, or to maintain a level of humidity of other elements. Bindings (not shown) may be attached to top surface 320, for instance using screws or bolts fastened to core 200.

Figure 4:
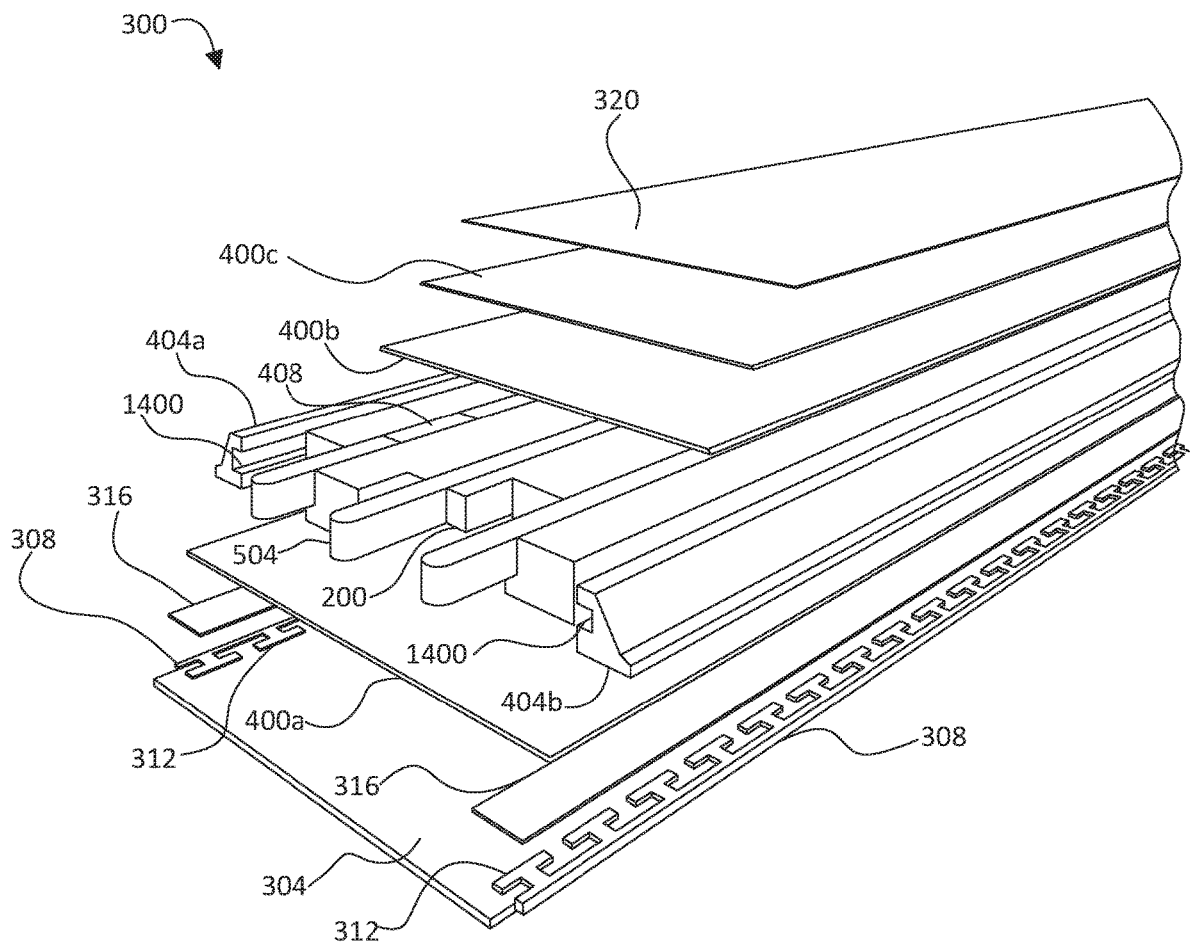
FIG. 4 is a cutaway perspective exploded view illustrating a portion of an exemplary snow sliding device in an embodiment.

Turning now to FIG. 4, an exemplary embodiment illustrating additional elements that may be provided in plurality of elements is shown. Plurality of elements may include one or more intermediate layers 400a-c. One or more intermediate layers 400a-c may be constructed of any material or combination of materials described above for the construction of any aforementioned element. One or more intermediate layers 400a-c may include one or more reinforcing layer constructed from materials that provide additional tensile strength to snow-sliding device, including without limitation a layer of metal, a layer formed from carbon fiber or graphene, or other material; as a non-limiting example, a reinforcing layer may be formed from aluminum textured with another metal, which may be titanium, which texturing may act to cause metal to adhere more securely to other elements. One or more intermediate layers 400a-c may include material incorporated to give snow-sliding device a desired property. For instance, a layer of textile such as flannel may be included to absorb epoxy or other material that adds weight or heft to snow sliding device 300. A layer of elastomeric material may be provided to add flexibility or resilience to snow-sliding device 300. Intermediate layers 400a-c may combine to add structural strength, shape, and/or resilience to snow sliding device 300. Each intermediate layer 400a-c may be provided by receiving the intermediate layer from a third party, manufacturing the intermediate layer using any suitable manufacturing method described above, or a combination thereof.

Figure 15:
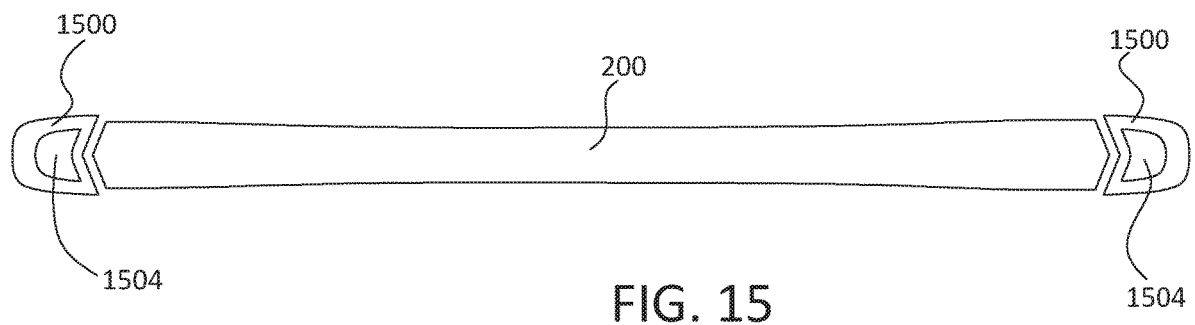
FIG. 15 is a schematic drawing illustrating an embodiment including endcaps.
Figure 16A:
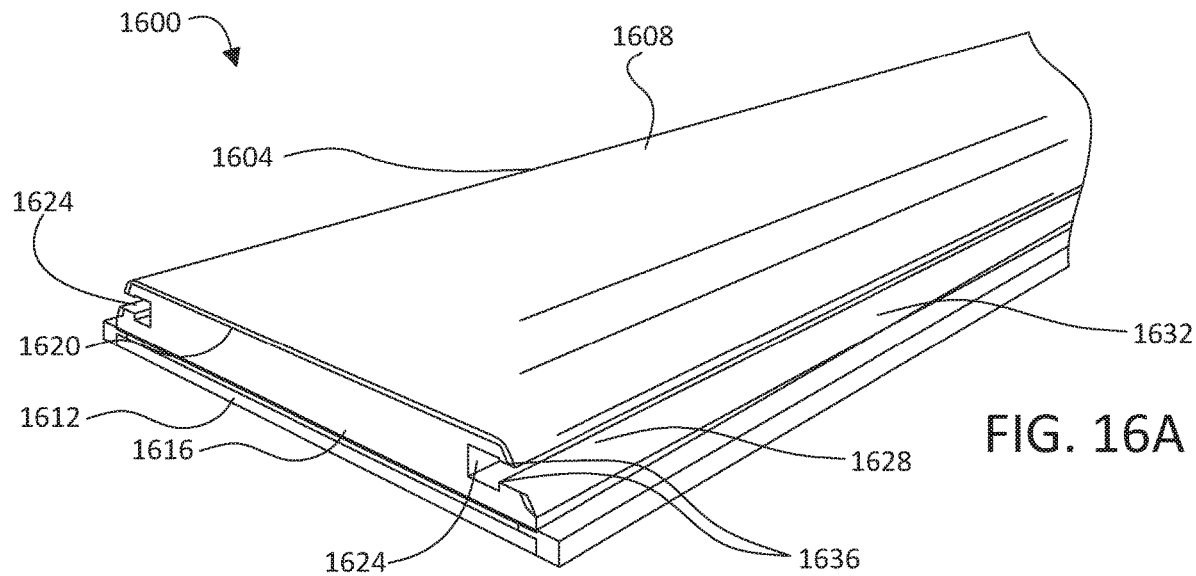
FIG. 16A is a cutaway perspective drawing illustrating an exemplary snow sliding device in an embodiment.

Still referring to FIG. 4, plurality of elements may include at least a sidewall 404a-b. At least a side wall 404a-b may be placed adjacent to a lateral side of core 200. At least a sidewall 404a-b may be constructed of any material suitable for constructing any element described above. In an embodiment, at least a sidewall 404a-b may be constructed from a high-density polymer material, including without limitation acrylonitrile butadiene styrene (ABS). At least a sidewall 404a-b may be provided by receiving at least a sidewall 404a-b from a third-party provider, manufacturing at least a sidewall 404a-b according to any manufacturing method described above, or a combination thereof. Plurality of elements may further include one or more end-spacers, for instance as shown in FIG. 15. One or more end-spacers may be composed of any material or combination of materials suitable for the construction of sidewalls 404a-b, including without limitation ABS; one or more end-spacers may be received from a third party, manufactured using any manufacturing method described herein, or a combination thereof. In other embodiments, snow-sliding device is constructed without a sidewall; for instance, top surface may be bent down around the sides in a cap construction, for instance as shown in FIG. 16A. Alternatively or additionally, sidewall may be an integral part of top surface. Snow-sliding device may be constructed with a partial cap construction, such as without limitation a sidewall that covers part of a side of the core, and a cap that covers the remainder.

Referring again to FIG. 1, and at step 120, a first material is incorporated in at least one of the core and the plurality of elements, the first material exhibiting a shear rate-dependent shear resistance. First material may be a non-Newtonian material. In an embodiment, first material may be a material having an increased shear resistance when exposed to an increased shear rate. First material may be dilatant material. First material may be a shear-thickening material. First material may be a material having decreased shear resistance when exposed to an increased shear rate. First material may be a pseudoplastic material. First material may be a shear-thinning material. First material may be a material that exhibits non-Newtonian properties when exposed to typical shear stresses imposed during movement over snowy surfaces in recreational use of snow-sliding device 300 of FIG. 3. First material may be a material that exhibits non-Newtonian properties in its installed form; for instance, first material may not require breakage or exposure to excessive force before exhibiting non-Newtonian characteristics.

Still referring to FIG. 1, first material may include any kind of non-Newtonian material as described above, including non-Newtonian solids, fluids, gels, foams, capsules, and the like. First material may be included in a non-fluid package, which may be any unit of material that does not allow the escape or evaporation of fluid or fluid-like elements of non-Newtonian material; non-fluid package may exhibit behavior of a solid when interacting with elements outside non-fluid package. As a non-limiting example, non-fluid package may include a unit of encapsulated non-Newtonian liquid or gel, as described above. Non-fluid package may include solidified non-Newtonian foam. Non-fluid package may include a non-Newtonian solid. Non-fluid package may include a unit of material composed wholly or in part of non-Newtonian fibers, non-Newtonian-material impregnated fibers, non-Newtonian material-impregnated fiber reinforced material, a non-Newtonian composite material, or a non-Newtonian layer material, as described above. In the ensuing discussion, one or more portions, which may be sections, layers, or other portions, of first material may have differing properties. For instance, first material may include one or more portions having a first density and one or more portions having a second density. First density may be greater than second density; second density may be greater than first density. First material may be incorporated in one or more portions having a first elasticity and one or more portions having a second elasticity. First elasticity may be greater than second elasticity; second elasticity may be greater than first elasticity. For instance, first material may be incorporated in one or more portions having a first resting position on a continuum from softness to rigidity as disclosed above, and one or more portions having a second resting position on the continuum. First resting position may be at a greater rigidity than second resting position; second resting position may be at a greater rigidity than first resting position. In general, for any category of variation possible in the construction, material composition, or physical properties of non-Newtonian materials as described herein, at least a first portion may embody a first variation while at least a second portion may embody a second variation.

Continuing to refer to FIG. 1, first material may be included at least a capsule containing first material; at least a capsule may be a plurality of capsules. At least a capsule may have flexible walls. At least a capsule may be formed to any shape or a part of any shape described below for exemplary forms for portions containing first material; at least a capsule may be assembled in a desired form by creating capsule walls of desired dimensions and filling with non-Newtonian material, by cutting a previously formed capsule into a desired size or shape, or by combining previously formed capsules into a desired size or shape. Cutting capsule may further include sealing walls of capsule together at locus of cut, for instance by heat-sealing.

With continued reference to FIG. 1, first material may be included in at least a pad of first material; for instance, at least a pad may be composed of non-Newtonian foam, solid, textile material, or composite material. At least a pad may include a plurality of pads. At least a pad may be formed to any shape or a part of any shape described below for exemplary forms of at least a portion; forming may be accomplished by assembling, matting, or weaving pad to desired size or shape, or by forming to a standard shape and either cutting or assembling standard-shaped pad or pads to desired size or shape of padding.

Still referring to FIG. 1, first material may display dilatant properties. For instance, first material may be apparently flexible or soft when subjected to low shear rates, such as slow-acting forces. First material may become harder or more rigid when subjected to higher stress rates. Thus, first material may be relatively pliable during typical navigation or motion through water but may become substantially stiffer during more powerful seas or when exposed to stronger currents. First material may display pseudoplastic properties. For instance, first material may be apparently hard or rigid when subjected to low shear rates, such as slow-acting forces. First material may become softer or more pliable when subjected to higher stress rates. Thus, first material may be relatively pliable when exposed to strong impacts or currents, and stiffer under more typical navigational circumstances.

With continued reference to FIG. 1, first material may exhibit other properties in addition to non-Newtonian properties; for instance, first material may combine non-Newtonian and elastic materials, and demonstrate both elasticity and shear rate-dependent shear resistance. Similarly, where first material includes non-Newtonian material in a flexible medium, first material may exhibit both flexibility and shear rate-dependent shear resistance.

With continuing reference to FIG. 1, first material may be incorporated in any element of the plurality of elements or the core in any suitable manner. In an embodiment, all of an element is made up of first material; for instance, a portion or all of an intermediate layer of at least an intermediate layer 400a-c as shown in FIG. 4 may be composed of first material. Portion or all of intermediate layer may be a pad, a set of pads or capsules assembled into padding, sheet of first material, and/or a wafer of or incorporating first material. An intermediate layer may include a layer or sublayer that is substantially all made up first material. As a further non-limiting example, any element of plurality of elements and core may contain intermixed non-Newtonian and other materials; for instance, non-Newtonian material may be intermixed with elastic material in solid or foamed form. Non-Newtonian material may be woven into non-dilatant material; for instance, filaments or fibers of dilatant material, or filaments, fibers, or textile impregnated with dilatant material, may be woven into non-dilatant material. Non-Newtonian material may be layered with non-dilatant material in vertical, horizontal, radial, or other arrangements of layers.

Continuing to refer to FIG. 1, first material may be incorporated using any manufacturing process described herein for the production or assembly of any component, set of components, or snow-sliding device as described herein. For instance, and without limitation, first material may be molded, such as by an injection molding process. First material may be molded to form any shape as described or illustrated below for the incorporation of first material in a void, groove, recess, or other space created for the inclusion of first material; alternatively or additionally, first material may be molded in combination with one or more elements of snow-sliding device that are created by molding, such as, without limitation, molding of core body 204, which may include molding a mixture of first material with other material making up core body 204 or molding core body out of first material. As an additional or alternative example, and without limitation, first material may be additively manufactured, such as by a stereolithographic or "3D printing" process. First material may be additively manufactured to form any shape as described or illustrated below for the incorporation of first material in a void, groove, recess, or other space created for the inclusion of first material; alternatively or additionally, first material may be additively manufactured in combination with one or more elements of snow-sliding device that are created by additively manufacturing, or may be added to any portion of and/or recess or void in any element or combination of elements by additive manufacturing. First material may be incorporated in or be any adhesive used in construction of snow-sliding device. First material may be incorporated in any coating, such as without limitation painted or laminated coatings, of snow-sliding device and/or any element thereof; painting or laminating any coating or layer on any element, set of elements, partial assembly, and/or snow-sliding device may include painting or laminating a coating or layer containing or composed of first material on the element, set of elements, partial assembly, and/or snow-sliding device. Where an element in which first material is incorporated includes one or more voids, such as voids in a honeycomb material or the like, first material may be included in the one or more voids.

With reference to FIG. 4, in an embodiment, any element of snow-sliding device 300 may include at least a first portion including a first material, and at least a second portion including at least a second material. At least a first portion may include any desired form. For instance, each of the at least a first portion may have a substantially rectilinear or board-like form. Each of plurality of first and/or second portions may have any three-dimensional or two-dimensional form encompassing regular or irregular polygonal, polyhedral, curved or combined forms. Each of at least a first portion may run substantially all the length or breadth of snow-sliding apparatus; for instance, at least a first portion may form a stripe-like pattern across performance surface. Each of at least a first portion may run less than a full length or breadth of an element; as a non-limiting example, at least a first portion and at least a second portion may form a tessellated pattern, such as a checkerboard-like pattern of rectilinear forms, a pattern of adjacent polygonal forms, curved forms, combinations thereof, or other spaces. Tessellated at least a first portion and plurality of sections of second material may include patterns of identical forms or varied forms; for example, different sections may have different shapes or sizes that combine to form an element. In an embodiment, first material is used in specific locations of particular elements, as illustrated in further examples below. Sections may be arranged in a staggered brick pattern with ends offset by a prescribed amount to ensure overlap. Each section of at least a second portion may have any size or shape suitable for a section of the at least a first portion. Dimensions and shapes of at least a second portion may complement dimensions and shapes of plurality of sections of at least a first material. At least a second material may include a substantially rigid material. Substantially rigid material may be any rigid material suitable for the construction of an element. At least a second material may include flexible material. Flexible material may include any flexible material suitable for use in any element as described above. Flexible material may include, without limitation, flexible polymers in block, sheet, or layered forms. Flexible material may include textile or fiber mat material. Flexible material may include flexible foam. At least a second material may include elastic materials. Elastic materials may include any elastic materials suitable for use in construction of snow-sliding apparatuses as described herein. Elastic material may include elastic polymers such as natural or artificial rubber material, silicone, and the like. Elastic material may include springs, such as metal leaf or coiled springs. Elastic material may use gas as an elastic material; for instance, elastic material may include closed cells, such as closed neoprene cells. At least a second material may include one or more non-Newtonian materials as described above.

Still referring to FIG. 4, at least a second material may include any combination of the above-described materials. At least a second material may include a first portion of substantially rigid material and a second portion of a different material. The different material may be substantially elastic material. The different material may be substantially flexible material. Combinations may be arranged side-by-side or vertically; for example, at least a first portion may be on top of at least a second portion or vice versa. A strip of one material may be laid on top of or embedded in a portion of another material. A plurality of first portions and/or second portions may be present in each section of at least a second material; for example, a section of at least a second material may include one or several rigid portions combined with any combination of flexible material, and elastic material.

Still referring to FIG. 4, at least a second material may include intermixed materials of two or more types. For instance, elastic and non-elastic flexible materials may be mixed together in a portion of at least a second material; as a non-limiting example, elastic fibers may be inserted or woven through an inelastic flexible material. Rigid and flexible or elastic pieces may be mixed together. Any material may be impregnated, woven, or intermixed with non-Newtonian material according to any method described above. Some sections of at least a first portion and at least a second portion may overlap. For instance, in some embodiments, a portion of at least a section of plurality of sections of at least a second material overlaps with at least one section of plurality of sections of first material. Overlapping portions of the at least a section of plurality of sections of second material and at least a section of the at least a first portion may have any form, including flanges, combinations of grooves and projecting ridges, combinations of recesses and protrusions, teeth, and the like. Overlapping portions may run the length of sections or may run only for a portion of sections. Incorporating a first material may further include incorporating the first material in the at least a buffer strip 316.

With continued reference to FIG. 4, incorporation of first material may include installing a fluid-impermeable barrier around the first material. Fluid-impermeable barrier may be a barrier that prevents all or substantially all fluid making up a part of first material from escaping a portion of first material; "fluid" as used herein refers to any material when that material behaves in a manner consistent with the behavior of a liquid or gas. Fluid may be material that behaves as a liquid or gas under particular circumstances; for instance, a non-Newtonian material that has varied rigidity depending on shear rate may behave in a fluid-like manner at one extreme of its range of properties as described above. A material may behave fluid-like at particular temperature ranges; for instance, a gel may behave as a liquid when stored above a certain temperature range. A material that is solid may have a liquid component; for instance, a foam or gel may contain water or other solvents that may evaporate or leak under particular ranges or combinations of humidity, temperature, and/or pressure. A material may have a fluid form during a manufacturing step; for instance, where first material is introduced as a froth and then cured to a foam or introduced as a liquid and then cured to a solid or gel, first material exhibits fluid behavior prior to curing. Some materials may partially or wholly reverse the curing process under certain temperatures or other environmental conditions; in this case, such materials may have at least a component that behaves as a fluid.

Continuing to refer to FIG. 4, fluid-impermeable barrier may be introduced in various ways depending on the manner of inclusion of first material. Fluid-impermeable barrier may be deposited as a skin or layer around an element of the plurality of elements and/or the core, where first material is incorporated in the element and/or the core; for instance, where the core or an element is entirely composed of first material, is impregnated with non-Newtonian material, composed of a composite material containing non-Newtonian material, or has non-Newtonian material introduced in spaces within the core or element, such as voids in a honeycomb structure, fluid-impermeable barrier may be placed around at least a portion of an exterior surface of the core or element. Similarly, where first material is incorporated as one or more portions embedded in core or an element of plurality of elements, fluid-impermeable barrier may be installed around the one or more portions; fluid-impermeable barrier may be installed between the one or more portions and the core or element in which the one or more portions are embedded, between the one or more portions and adjacent elements of snow-sliding device 300, or both. As a non-limiting example, a portion of fluid-impermeable barrier may be introduced as a layer, such as intermediate layers described below. Fluid-impermeable barrier may be created by sealing one or more surfaces of core, plurality of elements, and/or first material; for instance, a polymer sealant may be applied to surfaces and cured or allowed to cure. In an embodiment, one or more elements of plurality of elements are laminated together using an epoxy, resin, or other joining material that is fluid impermeable. A sheet of polymer material may be sealed to one or more surfaces. A sheet of polymer material may be wrapped around first material, core, or an element of plurality of elements to create fluid-impermeable barrier; for instance, where first material is introduced as a capsule, an exterior surface of capsule may be fluid-impermeable.

With continued reference to FIG. 4, use of fluid-impermeable barrier may confer a number of advantages. For instance, a foam, such as a non-Newtonian foam as described above, may behave optimally at a particular humidity, and may be capable of drying out due to loss of water vapor, or other vapors. As another example, a non-Newtonian material may ordinarily behave as a solid or gel, but may wholly or partially liquify under high temperatures, for instance when stored in an enclosed space on a hot day; fluid-impermeable barrier may prevent non-Newtonian material from escaping under such circumstances. Where non-Newtonian material includes a mix of materials, such as a suspension of particles in a fluid or gel or a combination of polymers of different properties, escape of relatively minute quantities of one ingredient of non-Newtonian material as liquid or vapor may alter the material properties of the non-Newtonian material; as a non-limiting example, a non-Newtonian material consisting of a suspension of particles in a liquid may move radically in the direction of rigidity, or cease to be non-Newtonian at all, if some of the liquid evaporates or otherwise escapes. Similarly, mixtures of polymers may separate over time, with polymers exhibiting more fluid-like behavior gradually leaching out; such mixtures may include a polymer element that exhibits fluid-like behavior when placed adjacent to certain other polymer materials, as is seen for instance when plastic items of certain types become fused to each other if left touching over time owing to interchange of plasticizing elements. As an additional factor, non-Newtonian material may absorb fluid introduced from one or more other elements or materials, such as additional humidity; introduction of additional fluid or vapor into non-Newtonian material may alter the material properties thereof and may be prevented by fluid-impermeable barrier. As another example, where lamination involves introduction of epoxy resin or similar lamination fluids, a fluid-impermeable barrier may prevent adulteration of non-Newtonian material with the resin. It should be noted that creation of first material itself may also produce a fluid-impermeable barrier; for instance, where first material includes a closed-cell non-Newtonian foam, the cell walls may act as a fluid-impermeable barrier.

Continuing to refer to FIG. 4, introduction of first material may further include introduction of a buffer element 408. Buffer element 408, as used herein, is an element that neutralizes the effect of a change in first material resulting from passage of time or environmental changes. Buffer element 408 may include any suitable material to perform its function as a buffer element. For instance, where first material becomes more rigid at certain temperatures or at certain shear rates, buffer element 408 may be constructed from materials including an elastic material that prevents separation of first material from adjacent materials, similarly to buffer strips 316 as described above. As another example, buffer element 408 may be used to add structural integrity at a portion of an element that contains a large amount of first material; for instance, where first material is dilatant, first material may confer greater structural strength when subjected to high shear rates, but lesser structural strength at low shear rates; a buffer element 408 including a rod or other item of high-strength material such as metal may strengthen that portion of snow-sliding device 100 at such moments. As a further example, where first material has a high coefficient of thermal expansion, buffer element 408 may include a material that compresses easily, absorbing the expansion of first material and preventing first material from exerting force on other elements, potentially weakening the lamination of the elements and diminishing the structural integrity of snow-sliding device 100; for instance, buffer element 408 may include an air-filled gap, an easily compressible foam, or the like. Buffer element 408 may also or alternatively include a material, such as air or elastic foam, that readily expands to accommodate shrinkage of first material where first material has a high coefficient of negative thermal expansion.

With continued reference to FIG. 4, at least a buffer element 408 may be installed with first material; installing with first material may include installing before, after, or in conjunction with first material. At least a buffer element 408 may be introduced as a layer above or below first material, interspersed with first material in any combination described above for combining first material with a second material, or in any combination of such methods, as useful for accomplishing the purpose to which buffer element 408 is being applied.

Still referring to FIG. 4, first material may be incorporated in core 200. In some embodiments, core 200 is formed from first material. For instance, and without limitation, core 200 may be formed by molding first material into core body 204 as described above; froth incorporating first material, for instance, may be injection molded and cured or allowed to cure into non-Newtonian foam. Similarly, core 200 may be constructed by lamination of layers of fiberglass with fibers impregnated with non-Newtonian material, or otherwise formed of a non-Newtonian composite material. Core may be constructed by molding, subtractive, or additive manufacturing processes from non-Newtonian solid material. Core may be formed of another material with a hollow space within into which non-Newtonian fluid, gel, foam, or other material is injected.

Figure 5A:
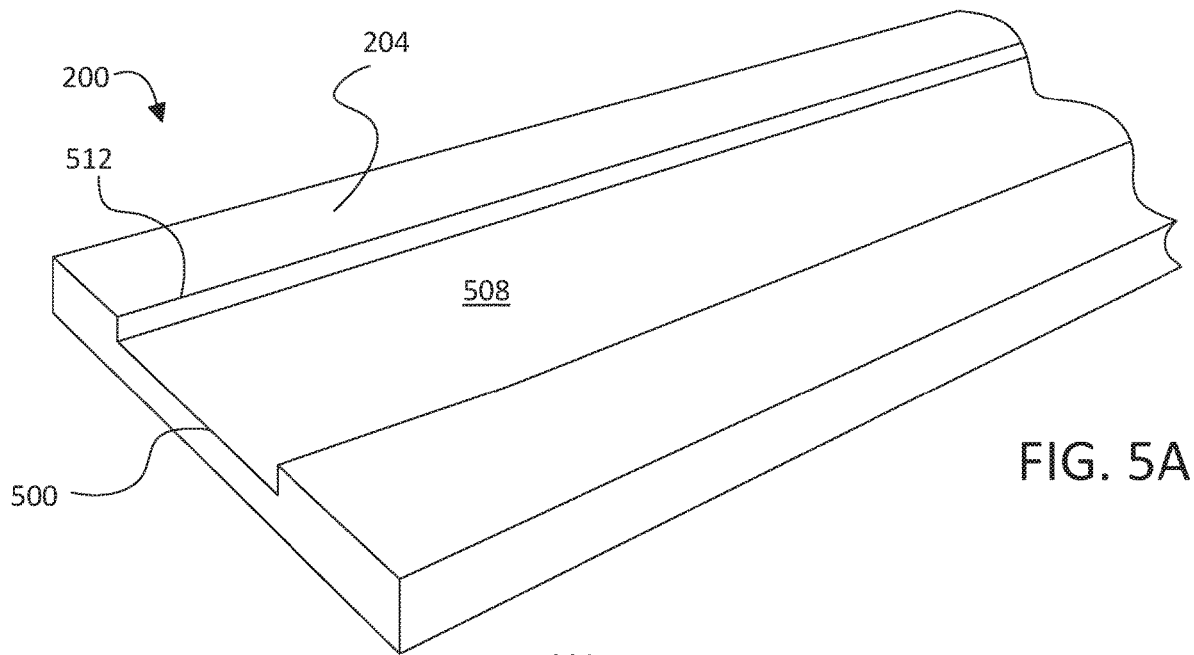
FIG. 5A is a cutaway perspective drawing illustrating an exemplary core in an embodiment.
Figure 5B:
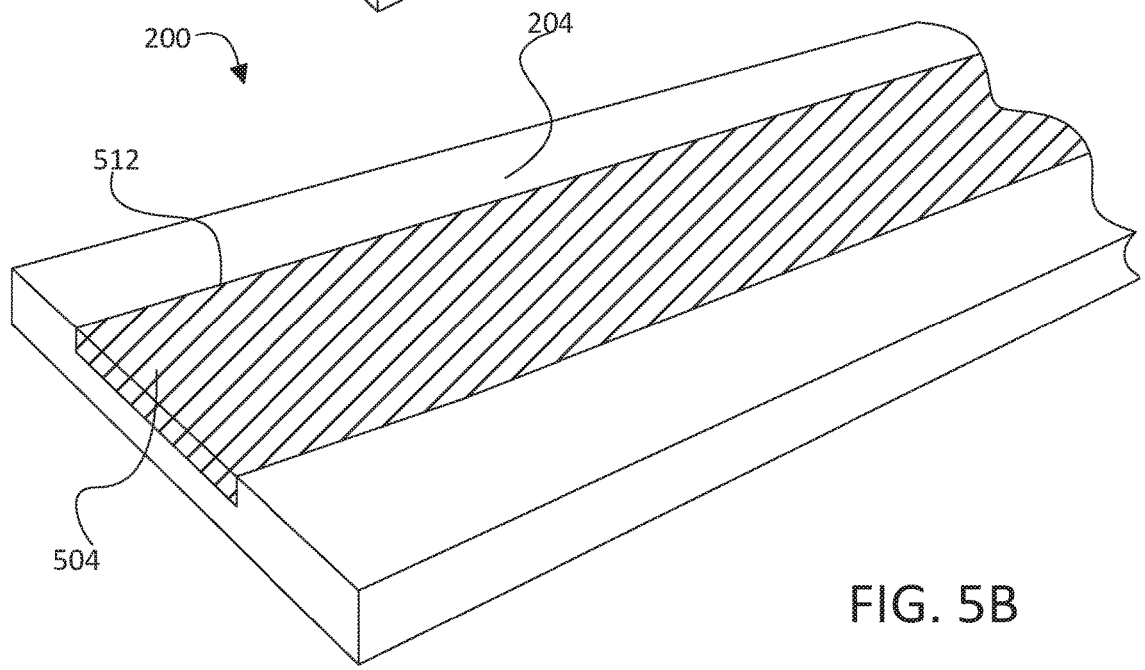
FIG. 5B is a cutaway perspective drawing illustrating an exemplary core in an embodiment.

Referring now to FIGS. 5A-B, first material may be incorporated in core 200 by forming at least a void 500 in core 200 and inserting first material 504 in the at least a void 500. At least a void 500 may be formed in core 200 according to any manufacturing process described above. For instance, in some embodiments, core body 204 is molded or additively manufactured with at least a void 500 incorporated. In other embodiments, at least a void 500 is formed in core body 204 subtractively; subtractive formation of at least a void 500 in core body 204 may be performed at any stage in the construction of core 200. For instance, at least a void 500 may be formed prior to or subsequent to shaping of core body 204. At least a void 500 may include an internal surface 508. Internal surface 508 may have any combination of planar and curved elements; for instance, internal surface 508 may have a substantially rectangular cross-section. Internal surface 508 may have a substantially curved cross-section. At least a void 500 may include an opening 512. Opening 512 may have any suitable shape, including polygonal, curved, or combined perimeter shapes.

Still referring to FIGS. 5A-B, incorporating first material 504 in at least a void 500 may include forming a piece of first material 504 to fit through opening 512 and against internal surface 508. As a non-limiting example, first material 504 may be provided as a sheet of foam, gel, textile, or solid first material, which may be cut to a shape to fit in at least a void 500; for instance, where at least a void 500 has a rectangular cross-section, first material 504 may be cut to have a similar rectangular cross-section. First material 504 may be formed into the desired shape using any manufacturing method, including without limitation subtractive, additive, or molding methods. First material 504 may be formed into one or more capsules that fit into at least a void 500. Alternatively, first material 504 may be poured into at least a void 500 in liquid or froth form, and either cured to form a solid, gel, or foam, or sealed in at least a void 500 by attaching a subsequent layer of the plurality of elements.

Continuing to refer to FIGS. 5A-B, internal surface 508 of at least a void 500 may be sealed to contain fluid material, prior to insertion of first material 504; in other words, introduction of a fluid-impermeable barrier between first material 504 and internal surface 508 may be accomplished at least in part by sealing internal surface 508. For instance, internal surface 508 may be coated with a layer of fluid-impermeable polymer; polymer may be painted, sprayed, or otherwise deposited on internal surface 508. Alternatively or additionally, one or more sheets of fluid-impermeable material may be adhered to internal surface 508. Adhesion may be achieved using adhesives such as superglue or the like. Adhesion may be achieved through heat treatment, such as by placing a sheet of polymer material against internal surface 508 and then heating the sheet to partially melt and/or mold itself to the internal surface 508. Sealing may also be achieved, as an alternative or in addition, by insertion of first material 504 in a capsule, as described above, having a fluid-impermeable outer surface. Fluid-impermeable outer surface may be adhered to internal surface 508. Sealed internal surface 508 may permit liquid-proof acceptance of first material 504 in liquid form, as part of various potential approaches to the introduction of first material 504. As a non-limiting example, first material 504 may be introduced in a liquid or partially liquid form and then solidified. For instance, first material 504 may be introduced as a liquid such as a liquid polymer and cured to form a solid; curing may be performed using application of curing chemicals, irradiation with electromagnetic radiation, by raising or lowering temperature of first material 504, by allowing first material 504 to cool, or any combination thereof. First material 504 may be introduced as a liquid and cured to form a gel; curing may involve any method suitable for curing to form a solid. First material 504 may be introduced as a liquid or partially liquid froth and then cured to form a foam; curing may involve any method suitable for curing to form a solid. First material 504 may be introduced in a partially liquid form and remain partially liquid; in this case, opening 512 of at least a void 500 may be sealed with a fluid-impermeable barrier. Fluid-impermeable barrier may be deposited on top of first material 504 in any manner described above for deposition of fluid-impermeable barrier.

Fluid-impermeable barrier may be deposited as an intermediate layer as disclosed herein; intermediate layer may be laminated to core 200 in the same process as lamination of other elements to core, or in a prior process. Sealing at least a void 500 may be advantageous as well in situations where first material 504 is substantially or mostly solid or gel at low temperatures, such as temperatures typically found while sliding on snow surfaces, but at warmer temperatures may be partially liquid.

First material 504 may be secured to internal surface 508; in some embodiments, first material 504 is adhered to internal surface 508 using an adhesive. As a non-limiting example, an adhesive, which may include without limitation a superglue such as cyanoacrylate adhesive, may be deposited on at least a portion of internal surface 508 prior to the insertion of first material 504. Alternatively or additionally, an adhesive may be applied to at least a portion of an exterior surface of first material 504 that contacts internal surface 508 upon insertion of first material 504. Adhesion may alternatively or additionally be performed by other processes, such as heat adhesion; where first material has adhesive properties, such as adhesive properties that accrue from introduction of liquid first material and subsequent curing within at least a void 500, adhesion may be performed as part of the application process. First material 504 in solid, foam, or gel forms, or capsules of first material, may be introduced in this manner. As an alternative, first material 504 may be secured to internal surface 508 by other means; for instance, first material 504 may be clamped into internal surface for shaping or other processes.

Figure 6:
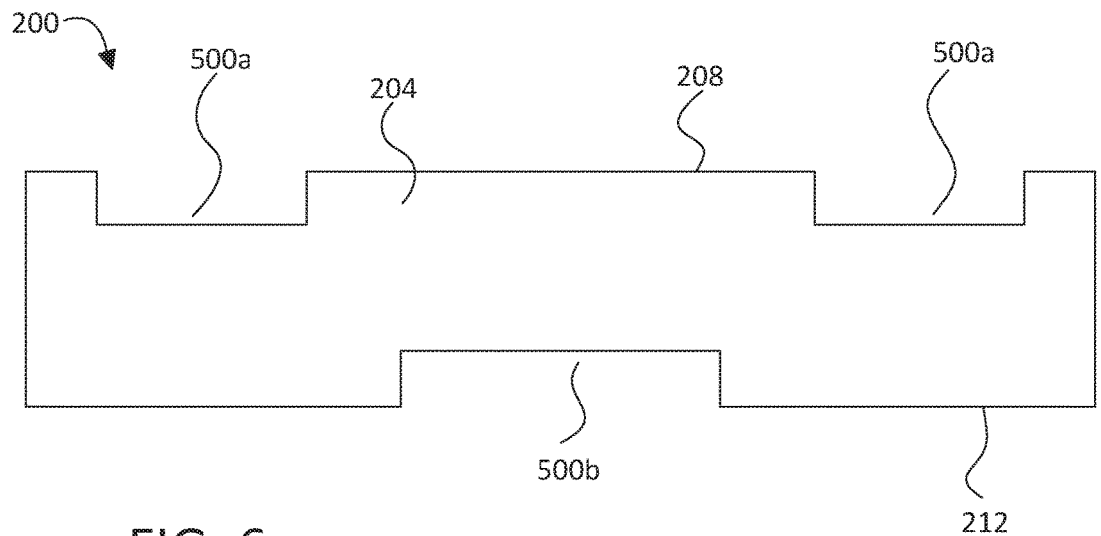
FIG. 6 is a schematic drawing illustrating a section of an exemplary core in an embodiment.

Now with reference to FIG. 6, an exemplary transverse cross-sectional view of core 200 is illustrated including at least a void 500*a* in upper surface 208 and at least a void 500*b* in lower surface 212. At least a void 500*a* may be formed in an upper surface of core body 204. At least a void 500*b* may be formed in a lower surface 212 of core body 204. Any configuration of as illustrated and/or described below, or any similar configuration of voids that may occur to a person of skill in the art upon reading the entirety of this disclosure, may be formed in either upper surface 208 or lower surface 212. At least a void 500*a* in upper surface 208 may be a different number of voids from at least a void 500*b* in lower surface 212. Introduction of first material 504 in voids on upper surface 208 and lower surface 212 may be performed serially: for instances, first material 504 may be poured and cured, adhered, sealed, or otherwise secured in at least a void 500*a* on upper surface 208, core 200 may be flipped over, and first material 504 may be poured and cured, adhered, sealed, or otherwise secured in at least a void 500*b* on lower surface 212. Similarly, and referring back to FIG. 5, where at least a void 500 may include a void on a lateral surface or terminal surface of core 200, core 200 may be positioned with a given void of at least void 500 having its opening 512 upward, and first material 504 may be inserted and secured in that void prior to turning the core 200 to present a different upwardly opening void of at least a void 500; this process may be repeated several times for different voids. Securing first material 504 in at least a void 500 may thus enable application of first material 504 in voids having openings on various different surfaces of core 200, providing more options in the manufacturing process.

Figure 7A:
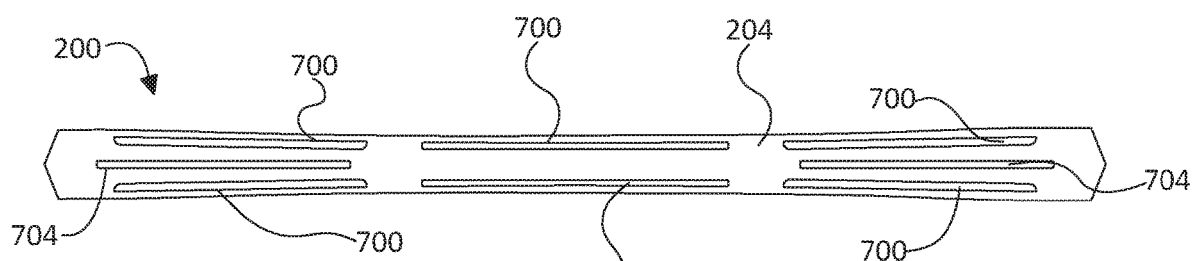
FIG. 7A is a schematic drawing illustrating an exemplary core in an embodiment.
Figure 7B:
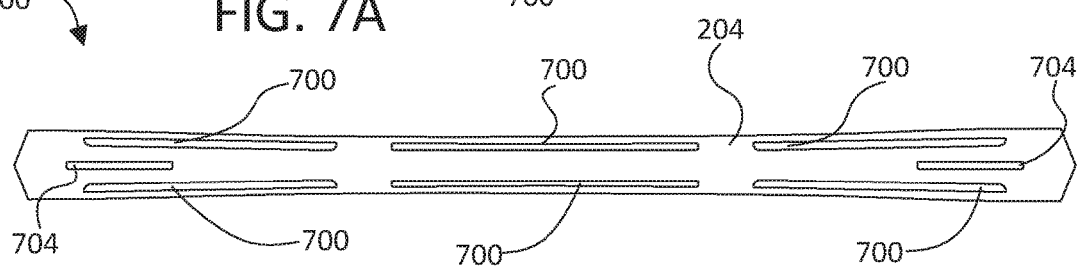
FIG. 7B is a schematic drawing illustrating an exemplary core in an embodiment.
Figure 7C:
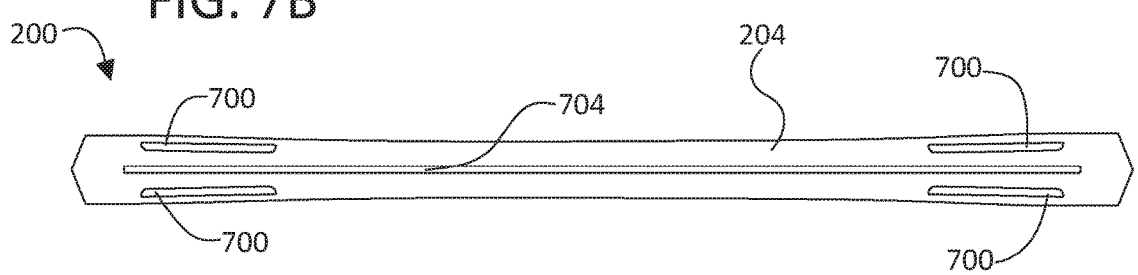
FIG. 7C is a schematic drawing illustrating an exemplary core in an embodiment.

Now referring to FIGS. 7A-C where an exemplary core 200 is shown from a surface that may be either the upper surface or lower surface and may have a longitudinal axis about which core body 204 may be symmetrical. At least a void 500 may be formed symmetrically with respect to the longitudinal axis of symmetry, forming at least a void 500 that may include forming at least a first void 700 a first distance from the longitudinal axis and at least a second void 704 a second distance from the longitudinal axis; the first distance may differ from the second distance. At least a void 500 may alternatively or additionally be asymmetrical with respect to a longitudinal axis of symmetry of core body 204. As illustrated here, second distance may be zero, and at least a second void 704 may be positioned on or around longitudinal axis. As illustrated for instance in FIG. 7A, at least a first void 700 may have the same volume, length, and depth of at least a second void 704 but with at least a first void having more numerous voids than at least a second void 704. As illustrated for instance in FIG. 7B, at least a first void 700 may have greater volume than at least a second void 704; this may be accomplished by forming at least a first void 700 of longer, wider, deeper, or more numerous voids than at least a second void 704. As illustrated for instance in FIG. 7C, at least a second void 704 may have greater volume than at least a first void 700; this may be accomplished by forming at least a second void 704 of longer, wider, deeper, or more numerous voids than at least a first void 700.

Figure 8:
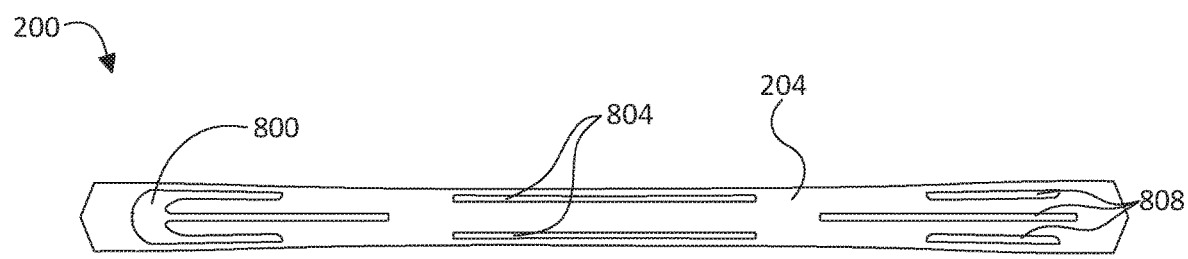
FIG. 8 is a schematic drawing illustrating an exemplary core in an embodiment.

Now with reference to FIG. 8, at least a void 500 may be formed with different volume per cross-sectional area at different points along the length of core body 204. For instance, at least a first void 800 in a front section of core body 204, at least a second void 804 in a central section of core body 204, and at least a third void 808 in a rear section of core body 204; each section may be occupied by greater or lesser volumes of voids. Voids may further have shapes that vary along their lengths resulting in, for example, a front section and rear section that are asymmetrical as opposed to a symmetrical configuration as described in FIG. 7 above. For instance, the shape of at least a first void 800 may include a wider section that divides and tapers to narrower sections with at least a second void 804 and at least a third void 808 having no tapering configuration but with configurations that may differ from each other. The depth of each section may vary.

Figure 9:
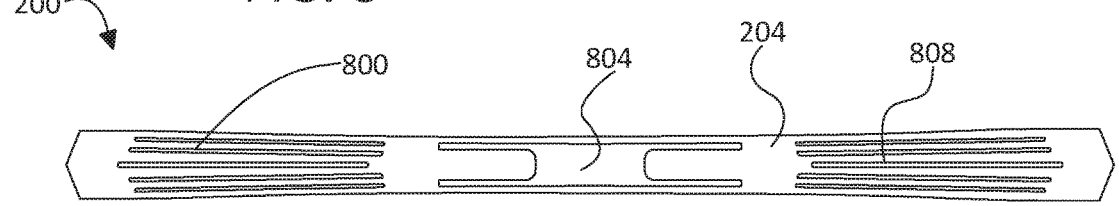
FIG. 9 is a schematic drawing illustrating an exemplary core in an embodiment.

Now with reference to FIG. 9, further configurational possibilities for voids in upper and lower surface of core body 204 are illustrated. Again, at least a void 500 may be formed with different volume per cross-sectional area at different points along the length of core body 204. The shape of at least a second void 804 may include a wider midsection which tapers to narrower sections towards both the front section of core body 204 and rear section of core body 204. At least a first void 800 and at least a third void 808 may then consist of numerous smaller voids of the same length and without tapering. The depth of each section may vary. Decisions on how and where to place at least a void 500 along the length of code body 204 is further discussed below with reference to FIG. 8 and FIG. 9 as exemplary embodiments.

Now referring to FIG. 8 and FIG. 9, method may include varying volume per unit length of voids to counteract different degrees of vibration along the length of core 200. For instance, where core 200 is likely to experience greater degrees of vibration or "chatter," a greater proportion of first material may have a greater dampening effect, counteracting the greater vibration. Method 100 may include causing core 200 to vibrate, and detecting at least an antinode of vibration, where an antinode is described as a location of the core 200 where amplitude of vibration is maximal. Method 100 may include forming at least a first part of the at least a void, wherein the first part includes the at least an antinode of vibration, the first part having at least a first volume per unit length, and forming at least a second part of the at least a void, the at least a second part having a second volume per unit length, where the second part does not contain the at least an antinode of vibration and the second volume per unit length is different from the first volume per unit length. Core 200 may be caused to vibrate by activating a machine to subject the core 200 to a predictable impact; this may be accomplished by dropping a weight on the core from a pre-determined height, by causing an elastic element to retract a fixed distance and releasing the elastic element, producing a predictable recoil acceleration and impact force. Alternatively, core 200 may be attached to a machine that generates vibration at desired frequencies and/or amplitudes, causing core 200 to vibrate with similar or sympathetic frequencies or amplitudes. Detection of antinodes may be performed by observing subsequent vibration of core using a strobe light or rapid-frame camera; alternatively, accelerometers may be placed at various lengths along core to measure the degree of vibration where placed. In an embodiment, after at least a void 500 is formed in core 200 with greater volumes of void at detected antinodes, and first material is inserted in voids, the core 200 may be subjected to a second vibration test as described above, to determine new antinodes; the above described process may be repeated a plurality of times, each time adding additional void and first material to arrive at an optimal degree of vibrational control.

Continuing to view FIG. 8 and FIG. 9, in some embodiments, a frequency for vibration is selected to match a probable frequency of vibration induced by a particular snowy surface; damped driven oscillation of snow-sliding device 100 at a regular frequency, for instance as occasioned by passage over a surface having a particular granularity, degree of slippage, ice content, compactness, or the like, may result in a particular frequency of vibration dictated by snowy surface. Vibration induced by a particular snowy surface may be calculated, for instance using a mathematical relation between surface granularity, or another surface attribute, and frequency of vibration. Vibration induced by a particular snowy surface may be measured; for instance, video such as slow-motion video, or accelerometer data from one or more accelerometers attached to snow-sliding device, may be observed to determine vibration induced by the surface. Vibration induced by the surface may have primary or secondary waveform elements; in an embodiment, data such as accelerometer data is subjected to frequency analysis, such as fast Fourier transform (FFT) analysis to determine at least a dominant waveform frequency or a plurality of significant waveform frequencies. Snow-sliding device may then be subjected to vibration at one or more frequencies thus determined to be induced by snowy surface, and voids of at least a void 500 may be selected to dampen each frequency of the induced frequencies, for instance by detecting various antinodes and creating voids of greater volume per unit length at each antinode.

With continued reference to FIG. 8 and FIG. 9, vibration testing may determine that different snowy surfaces have different imposed vibrations; for instance, a powder surface may induce a different vibration from a groomed surface, which may in turn differ from a granular surface created by freeze-thaw cycles. At least a void 500 may be formed in core 200 with sections having greater volume per unit length at antinodes of each such different frequency. Where there are multiple antinodes corresponding to multiple significant or dominant frequencies induced either by the same surface or a different surface, voids of at least a void 500 may be placed at each the multiple antinodes, for instance at least a void 500 may include a first section having a first volume per unit length at a first antinode relating to a first frequency of vibration, a second section having a second volume per unit length at a second antinode relating to a second frequency of vibration, and at least a third section having a third volume per unit length that is not at the first antinode or second antinode; third volume per unit length may be less than first volume per unit length and second volume per unit length. Each of first volume per unit length and second volume per unit length may be proportional to a measured or calculated amplitude of first frequency and second frequency, respectively; for instance, where first frequency is determined to have a first typical amplitude and second frequency is determined to have a second typical amplitude, and the first typical amplitude is greater than the second typical amplitude, first volume per unit length may be greater than second volume per unit length. This may be repeated in like manner for three or more frequencies having three or more antinodes of vibration. Any of the above-described vibration-testing techniques may be applied to determine placement of voids in other elements of snow-sliding device 100 as set forth in further detail below; furthermore, voids may be placed solely at one or more antinodes of vibration, replacing at least a third void with a section of core (or other element of snow-sliding device 100) having no void.

Continuing to view FIG. 8 and FIG. 9, where snow-sliding device contains a cavity for inserting an insert, as described in further detail below, different inserts may be manufactured having greater proportions of non-Newtonian material at antinodes of different frequencies imposed by different surfaces. For instance, a first insert may be designed having a first section at an antinode of vibration at a first frequency imposed by a first snowy surface, and a second section that is not at an antinode at that frequency, where the first section has a greater proportion of non-Newtonian material than the second section; a second insert may be designed having a third section at an antinode of vibration at a first frequency imposed by a first snowy surface, and a fourth section that is not at an antinode at that frequency, where the third section has a greater proportion of non-Newtonian material than the fourth section. Inserts may be designed, for instance, for different surface conditions, so that a user may insert one insert prior to use of snow-sliding device 100 on a first surface and a different insert prior to use of snow-sliding device 100 on a second surface.

Figure 2B:
FIG. 2B is a schematic drawing illustrating an exemplary core blank in an embodiment.

Still viewing FIG. 8 and FIG. 9, in an embodiment voids having greater width may be formed at sections of core 200 that have lesser thickness; for instance, portions of core having second thickness as described above in reference to FIGS. 1-2 may have at least a void forming a greater proportion of volume of those portions, while portions having first thickness may have at least a void forming a lesser proportion of volume. As a result, thinner sections of snow-sliding device 300 that may be more prone to vibration may include greater proportions of first material, and thus incorporate stronger vibration dampening effects. In an embodiment, void may be formed having at least 30% of the volume of core 200.

Figure 10:
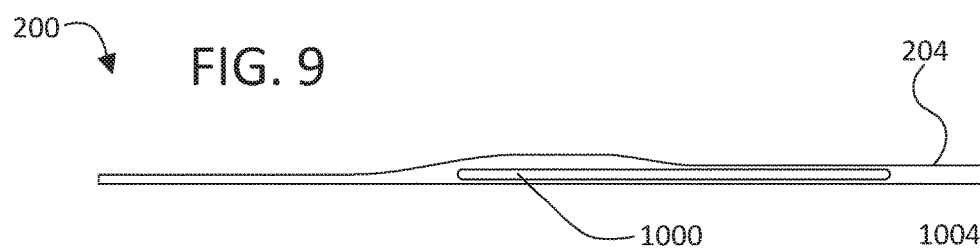
FIG. 10 is a schematic drawing illustrating an exemplary core in an embodiment.
Figure 11:
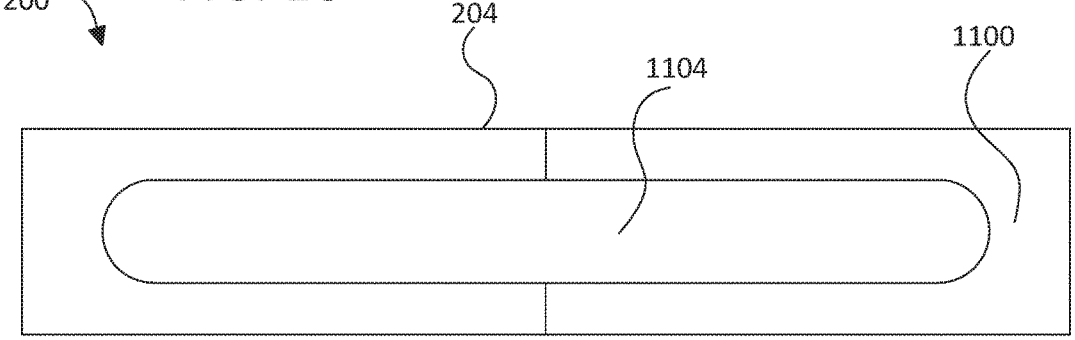
FIG. 11 is a schematic drawing illustrating an exemplary core in an embodiment.

Referring now to FIG. 10, at least a void 500 may include a void formed in a surface other than upper surface or lower surface. For instance, forming at least a void may include forming at least a void 1000 in a lateral surface 1004 of core body 204; at least a void may be formed in each lateral surface. As shown in FIG. 11, core 200 may include a terminal surface 1100. Forming at least a void may include forming at least a void 1104 in a terminal surface. At least a void may be formed in each terminal surface; for instance, at least a void may be formed in the front surface at the front tip of core body 204, and in the rear surface of core body 204.

Figure 12:
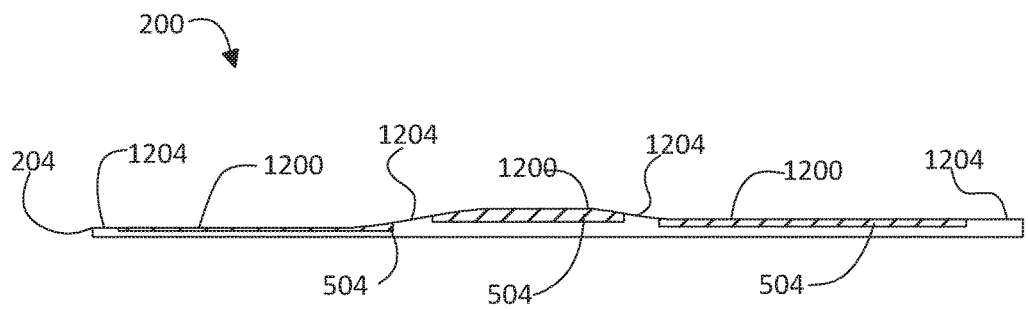
FIG. 12 is a schematic drawing illustrating an exemplary core in an embodiment.

Turning now to FIG. 12, method 100 may include shaping an exterior surface 1200 of first material 504 to match a portion 1204 of the outer surface adjacent to the at least an opening. First material 504 may be shaped to have an exterior surface 1200 substantially flush to the outer surface of core 200; as a result, first material 504 may present a continuous or near-continuous surface with outer surface. In an embodiment, first material 504 may be shaped prior to insertion in void; first material may be inserted projecting from void and then subjected to subtractive manufacturing to shape exterior surface to match the portion 1204 of the outer surface. First material 504 may be inserted in void prior to shaping core body 204; as a result, the shaping of core body 204 may simultaneously shape first material. As a non-limiting example, voids may be formed in core blank 232, which may then be shaped, for instance, by insertion in a CNC machine that sands or otherwise shapes blank to form core 200. Where first material is secured to internal surface 508 of at least a void 500, first material may be held in place against forces subjected by subtractive manufacturing; as a non-limiting example, where first material 504 is a foam, foam may be cut to a shape of at least a void 500, adhered to internal surface 508, and then shaped with core, for instance by simultaneously sanding core and first material 504.

Still referring to FIG. 12, any step of forming at least a void 500, shaping at least a void 500, incorporating first material 504, and/or shaping first material 504 may include modifications to account for variations in material properties between first material 504, core body 204, and/or other elements of snow-sliding device 300. For instance, and without limitation, where first material 504 has a greater tendency to expand or shrink with changes of temperature, a portion of at least a void 500 may be left empty to allow room for first material expansion and/or contraction. Alternatively or additionally, at least a void 500 and/or elements used to seal at least a void 500 may be formed or combined to restrict material fluctuations of first material 504; for instance, the at least a void and/or elements may be formed to confine first material 504 to a fixed geometry, within some tolerance, counteracting, for instance, fluidity or thermal expansion properties tending to cause changes in geometry of the first material 504.

Figure 13:
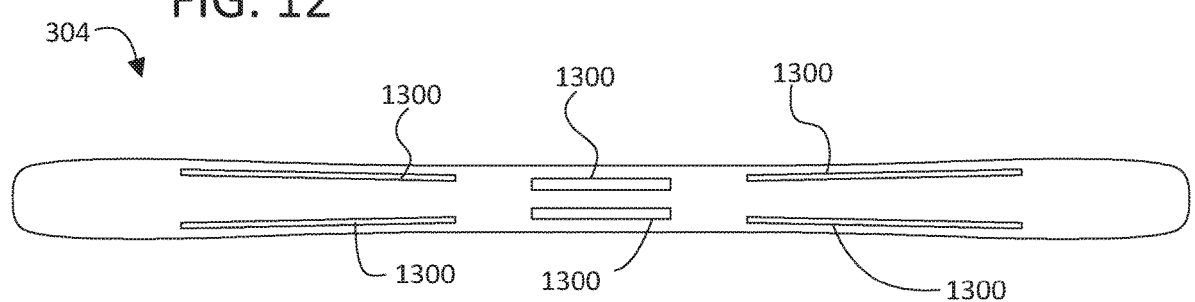
FIG. 13 is a schematic drawing illustrating an exemplary base in an embodiment.

Referring now to FIG. 13, incorporating a first material may include incorporating the first material in base 304. Incorporation in the base 304 may be performed in any way described above, including by forming base layer from first material. Incorporation in base 304 may include forming at least a void 1300 in an upper surface of the base 304 and inserting first material in the at least a void 1300. At least a void 1300 may have an opening facing an opening of at least a void 500 in core 200; first material may be shared between a void of at least a void 1300 and a void of at least a void 500. Forming at least a void 1300 may be performed according to any procedure and by any means described above for forming at least a void 500, including without limitation vibration testing as described above. Incorporation of first material in at least a void 1300 may be performed using any processes described above, including sealing at least a void 1300 and/or securing first material in at least a void 1300.

Figure 14A:
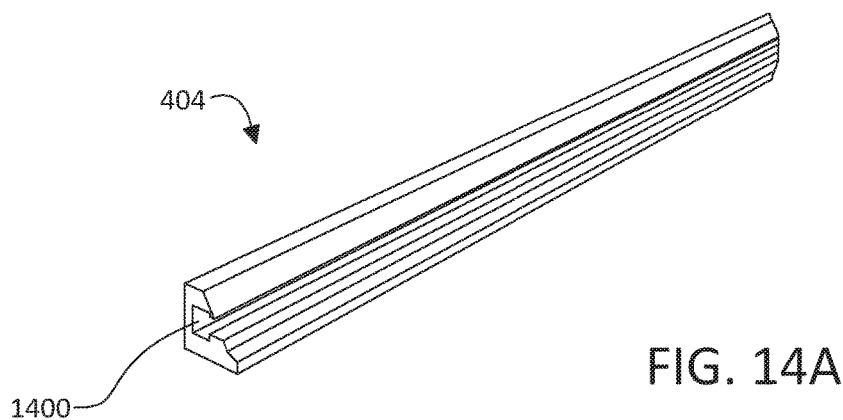
FIG. 14A is a cutaway perspective drawing illustrating an exemplary sidewall in an embodiment.
Figure 14B:
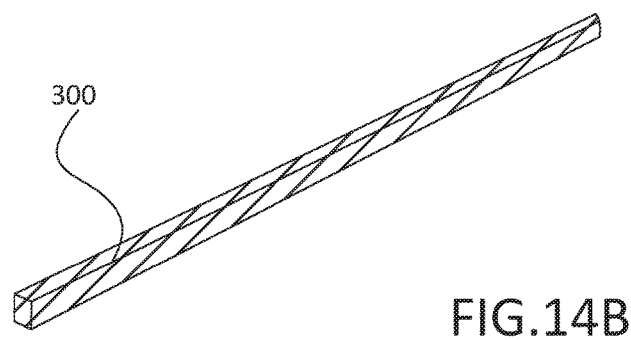
FIG. 14B is a cutaway perspective drawing illustrating an exemplary insert in an embodiment.

Referring now to FIG. 14A, incorporating a first material may include incorporating the first material in a sidewall 404. Incorporation in sidewall 404 may be performed in any way described above, including by forming sidewall 404 from first material. Incorporation in sidewall 404 may include forming at least a void 1400 in a lateral surface of sidewall 404 and inserting first material in the at least a void 1400; forming at least a void 1400 and/or incorporation of first material in at least a void 1400 may be performed using any processes described above, including without limitation vibration testing, sealing at least a void 1400 and/or securing first material in at least a void 1400. At least a void 1400 may face an exterior surface of sidewall 404; in an embodiment, as illustrated in FIG. 14B, first material maybe provided as an insert 1404 that is slidably removable from at least a void 1400, permitting a user to insert or remove the insert 1404 from the at least a void 1400; this may produce a user-customizable ski as described in further detail below. As illustrated for instance in FIG. 4, at least a void 1400 may alternatively face inward toward core 200; at core may include a void of at least a void 500 facing at least a void 1400, and first material may be inserted in a single unit shared between the two facing voids.

In an embodiment, as illustrated for instance in FIG. 15, incorporating a first material may include incorporating the first material in an end spacer 1500. Incorporation in end spacer 1500 may be performed in any way described above, including by forming end spacer 1500 from first material. Incorporation in end spacer 1500 may include forming at least a void 1504 in a surface of end spacer 1500 and inserting first material in the at least a void 1504; forming at least a void 1504 and/or incorporation of first material in at least a void 1504 may be performed using any processes described above, including without limitation vibration testing, sealing at least a void 1504 and/or securing first material in at least a void 1504. At least a void 1504 may face inward toward core 200; core 200 may include a void of at least a void 500 facing at least a void 1504, and first material may be inserted in a single unit shared between the two facing voids.

Referring again to FIG. 1, and at step 125, method 100 includes combining the plurality of elements with the core. Where one or more elements of the plurality of elements is an integral part of core 200 as described above, combining the one or more elements with the core 200 may include forming the one or more elements on the core 200 or forming a surface or other aspect of one or more elements on the core 200; for instance, where base 304 is an integral part of core 200, combining the base 304 with the core 200 may include preparing or shaping sliding surface of the base. Where one or more elements of plurality of elements are not an integral part of core 200, combining the one or more elements with the core 200 may be accomplished by any process for joining one or more elements together, including without limitation laminating or adhering together layers or sections of material. In an exemplary embodiment described for the purposes of illustration, base 304, metal edges 308, at least a buffer strip 316, core 200, and top surface 320 may be placed together into a form (not shown) having a final shape; final shape may, for instance, force elements at front tip of the ski to curve upward to create an upwardly curving tip. Where elements include sidewalls, sidewalls may also be included. Where elements include end spacers, end spacers may be included at terminal surfaces of core; end spacers may be adhered to terminal surfaces or may be placed in proximity and secured in place by form. Where elements include one or more intermediate elements, intermediate elements may be placed at designated positions between other elements. Form may close over elements, securing them in place. Lamination may include pumping epoxy into form, allowing epoxy to permeate between core and plurality of elements, connecting all of core and plurality of elements together. Lamination may include curing epoxy; epoxy may cured by waiting for epoxy to solidify, subjecting epoxy to a change of temperature, or the like. Method 100 may include removing snow sliding device 300 from form.

Non-Newtonian first material may confer various advantages regarding vibration control. Where first material is a dilatant material, higher shear rates induced by higher amplitude oscillations may cause first material to stiffen further, increasing overall damping of oscillation, and particularly resisting movement of oscillation at points during which oscillation is at peak kinetic energy, and therefore peak velocity; this may dampen oscillation to a negligible level far more rapidly for a given quantity of damping material, permitting first material to be used in smaller amounts than conventional damping material. As a result, snow sliding device may provide a user with a smoother ride by dampening or cancelling out vibration or "chatter." Incorporation of non-Newtonian material may permit designers to take advantages in variations in flexibility and stiffness of the non-Newtonian material under different circumstances to achieve two or more performance goals simultaneously. For instance, certain maneuvers may be performed more deftly by a flexible ski, while a stiff board may be necessary to hold to a course at high velocity or on rougher surfaces; where non-Newtonian material is a dilatant material, a snow-sliding device may be flexible under slower shear rates and stiff under high shear rates, allowing a combination of expert maneuvers and handling at high velocity that previously was unattainable. Similarly, inclusion of non-Newtonian material in snow sliding device may enable designers or users to achieve a performance goal without sacrificing robustness or durability.

Certain embodiments of a method for manufacturing a snow-sliding device incorporating a non-Newtonian material have been described herein. Described and depicted embodiments are presented herein for illustrative purposes only, to aid in understanding the disclosed snow sliding device, and are not intended to limit the scope of the disclosed snow sliding device to the particular embodiments depicted or illustrated. Persons skilled in the art, upon reading the entirety of this disclosure, will be aware of many possible alternative ways to implement snow sliding device as disclosed, each of which are within the scope of this disclosure. Any version, embodiment, or example described above including any kind of non-Newtonian material in combination with or replacing any other material described as a component material of any version, embodiment, or example described above is further contemplated as within the scope of this disclosure. Furthermore, any snow sliding device including a non-Newtonian material in any way is contemplated as within the scope of this disclosure.

Referring now to FIG. 16A, an exemplary embodiment of a user-customizable snow sliding device 1600 is illustrated. User-customizable snow sliding device 1600 may include an elongated body 1604 having an outer surface 1608. The outer surface 1608 may be formed of any element or combination of elements that combine to form an exterior surface of a snow-sliding device 300 as manufactured according to any embodiment of method 100 as described above. Body 1604 may include a base layer 1612; as a non-limiting example, base layer may be any base 304 manufactured or provided according to any embodiment of method 100 as described above. Body 1604 may include a core layer 1616 laminated to the base layer 1612. As a non-limiting example, core layer 1616 may include any core 200 as manufactured or provided according to any embodiment of method 100 as described above. Core layer 1616 may be directly laminated to base layer, or may be laminated to one or more intermediate layers, such as without limitation intermediate layers 400a-c as described above in reference to FIG. 1 and FIG. 4, portions of metal edges, such as without limitation metal edges 308 as described above in reference to FIG. 1, FIG. 3, and FIG. 4, and/or buffer strips, such as without limitation buffer strips 316 as described above in reference to FIG. 1, FIG. 3, and FIG. 4. Body 1604 may include a top layer 1620; as a non-limiting example, top layer 1620 may be any top surface 320 as manufactured or provided according to any embodiment of method 100 described above. Top layer 1620 may be laminated to core layer 1616. Top layer 1620 may be directly laminated to core layer 1616 or may be laminated to one or more intermediate layers that in turn are laminated to core layer 1616; one or more intermediate layers may include, without limitation, any intermediate layers 400a-c as described above in reference to FIG. 1 and FIG. 4.

Figure 17A:
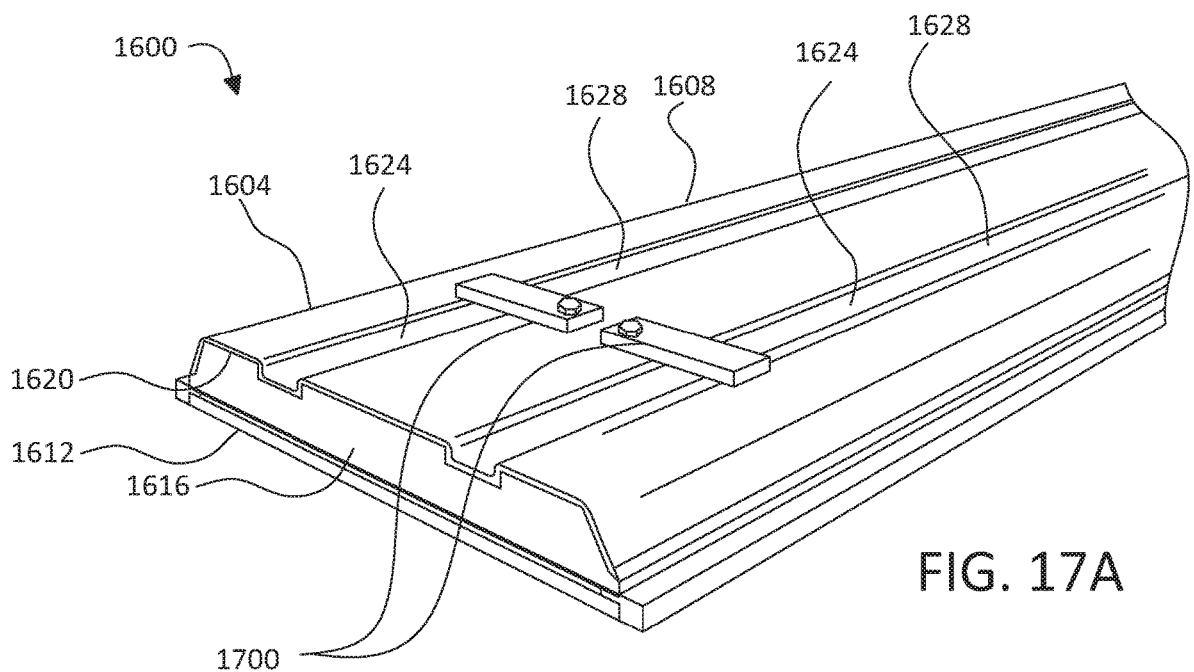
FIG. 17A is a cutaway perspective drawing illustrating an exemplary snow sliding device in an embodiment.

Still referring to FIG. 16A, snow-sliding device 1600 may have a cap, full sidewall or hybrid/partial sidewall construction. Top layer 1620 may be laminated over sides of core layer 1616 to form a cap, as shown in FIG. 16A and FIG. 17A; one or more intermediate layers may similarly be laminated over sides of the core layer 1616. Alternatively, snow-sliding device 1600 may include sidewalls, which may include without limitation any sidewalls as manufactured or provided according to any embodiment of method 100 as described above. Sidewalls may be full sidewalls that cover the entire extent of core layer 1616. Sidewalls may be partial sidewalls that cover a portion of core layer 1616, while remainder of core layer 1616 may be covered by top layer 1620, with or without coverage by one or more intermediate layers. Top layer 1620 may be laminated to tops or sides of sidewalls.

Continuing to refer to FIG. 16A, snow-sliding device 1600 may include at least a metal edge, which may include without limitation any metal edge 308 as manufactured or provided according to any embodiment of method 100 as described above. Metal edge may include without limitation at least a portion resting on top of base layer 1612; at least a portion may be any at least a portion 312 as manufactured or provided according to any embodiment of method 100 as described above. Snow sliding device 1600 may include at least a buffer strip disposed on top of at least a portion of metal edge; at least a buffer strip may include without limitation any at least a buffer strip 316 as manufactured or provided according to any embodiment of method 100 as described above.

With continued reference to FIG. 16A, snow sliding device 1600 may include at least a cavity 1624. At least a cavity 1624 may include at least an opening 1628 in the outer surface. Where snow sliding device 1600 has a longitudinal axis, which may be an axis of symmetry, at least a cavity may be symmetrical with respect to the longitudinal axis. At least a cavity may include at least a first cavity on a first side of the longitudinal axis and at least a second cavity on a second side of the longitudinal axis. At least a cavity 1624 may include at least a cavity in a lateral side of snow-sliding device 1600, for instance as shown in FIG. 16A. At least an opening 1628 may include a frontal opening through which an insert, as described below, may be slid; alternatively or in addition, at least an opening 1628 may include a lateral opening 1632. Lateral opening 1632 may include one or more lips 1636 that secure an insert in place within at least a cavity 1624; alternatively or in addition, a securing device, which may be any securing device as described above. At least a cavity 1624 may run the length of each lateral side or may run part of the length of each lateral side; at least a cavity 1624 may include two or more cavities per lateral side. At least a cavity 1624 may have an elongated shape; for instance, the at least a cavity 1624 may form a channel or groove in lateral surface. At least a cavity 1724 may have any suitable cross-sectional form, including polygonal or curved cross-sectional forms, or cross-sectional forms combining curved or polygonal elements.

Still viewing FIG. 16A, at least a cavity 1624 in lateral side of snow sliding device 1600 may be a cavity formed in a lateral side of core layer 1616, where snow sliding device 1600 has a cap configuration as shown in FIG. 16A. One or more layers, which may include without limitation top layer 1620 and/or intermediate layers, may be laminated to an internal surface of at least a cavity 1624 to seal core layer 1616 against humidity or other hazards; alternatively, an additional layer (not shown) or a coating of epoxy may be laminated or deposited within at least a cavity 1624 for like effect. Where snow sliding device 1620 includes at least a sidewall, at least a cavity 1624 may include at least a cavity in sidewall; this may be implemented, for instance, as shown above in reference to FIG. 14A and FIG. 14B.

Referring now to FIG. 17A, at least a cavity 1624 may include at least a cavity formed at top surface of snow sliding device 1600. Cavity formed at upper surface may include a cavity formed in an upper surface of core layer 1616. Top layer 1620 and or one or more intermediate layers may be laminated within cavity at top surface; alternatively, an additional layer (not shown) or a coating of epoxy may be laminated or deposited within at least a cavity 1624 for like effect. Snow sliding device 1600 may include a securing device 1700 that secures at least an insert within cavity 1624; securing device 1700 may include without limitation one or more latches, straps, fasteners, bars, bolts, strips of rigid or elastic material, textiles fastened by any suitable means for fastening textiles, and the like.

Figure 16B:
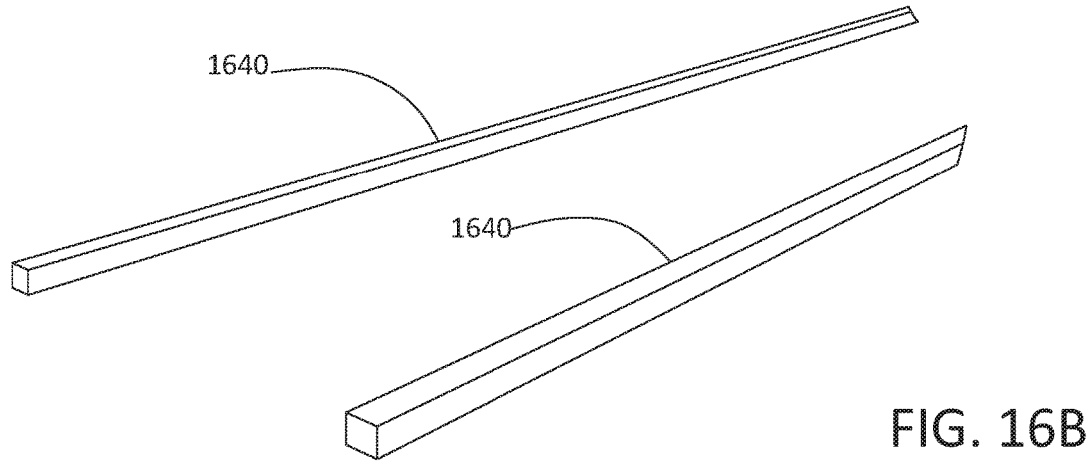
FIG. 16B is a cutaway perspective drawing illustrating an exemplary insert in an embodiment.
Figure 17B:
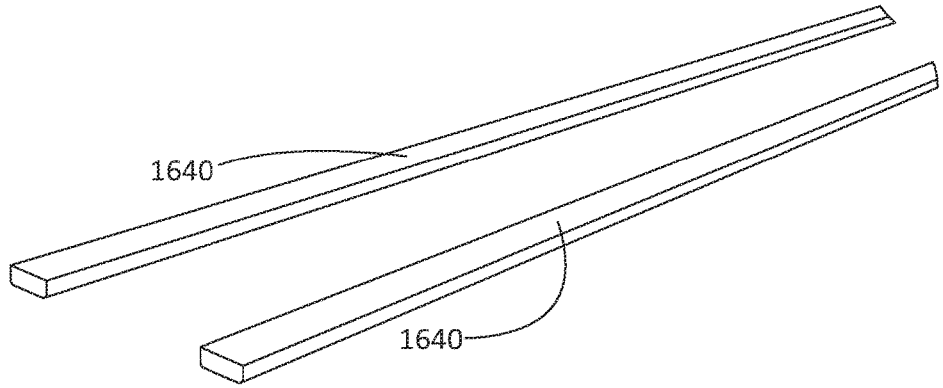
FIG. 17B is a cutaway perspective drawing illustrating an exemplary insert in an embodiment.

Referring now to FIG. 16B and FIG. 17B, snow sliding device 1600 may include at least an insert 1640 formed to insert in cavity 1624. At least an insert 1640 may have any form suitable for the shape of cavity 1624; at least an insert 1640 may have a similar or identical cross-sectional form to at least a cavity 1624. At least an insert 1640 may fit snugly within at least a cavity 1624. At least an insert 1640 may run the length of at least a cavity 1624, or less than the length of at least a cavity 1624; at least an insert 1640 may include a plurality of sections to be inserted in at least a cavity 1624.

With continued reference to FIG. 16B and FIG. 17B, at least an insert 1640 may be composed of any suitable material or combination of materials, including without limitation any material or combination of materials described above in reference to FIGS. 1-15. At least an insert 1640 may include at least a first insert having one or more material elements. For instance, at least an insert 1640 may include at least a first insert including a first proportion of a first material, the at least a first material exhibiting shear rate-dependent shear resistance. First material may be any first material as described above in reference to FIGS. 1-15. First material may be any non-Newtonian material and/or any material incorporating non-Newtonian material as described in this disclosure. At least an insert 1640 may include at least an insert not containing first material; at least an insert 1640 may, for instance, include an insert composed of elastic materials such as elastic polymers including without limitation natural or artificial latex, plastic, or silicone. At least an insert 1640 may include an insert constructed of substantially rigid materials such as ABS, metal, wood, fiberglass, or any other substantially rigid materials. At least an insert 1640 may include an insert constructed of material exhibiting identical or similar properties to core layer 1616, sidewalls, base, or other portions of snow sliding device 1616. At least an insert 1640 may include a weighted insert; in one embodiment, weight of weighted insert is evenly distributed. Weight of weighted insert may be unevenly distributed as well. For instance, weighted insert may include one end that is weighted and another end that is not weighted. Weighted insert may include one or more weighted sections that may be combined with unweighted sections to place a weighted portion of insert at any point along at least a cavity 1624.

With continued reference to FIG. 16B and FIG. 17B, inserts of at least an insert 1624 may include pluralities of sections having different properties, either attached together or combinable by a user by attachment or combined inclusion in at least a cavity 1624. Any section of the pluralities of sections may be composed of any material or combination of materials described above; to describe a few of various non-limiting examples, an insert 1640 may include some sections that are purely elastic or rigid, others that exhibit shear-rate dependent shear resistance, others that are weighted, and/or others that are flexible. Any possible combination of sections, whether user-formed or prefabricated, is contemplated as within the scope of this disclosure.

With continued reference to FIG. 16B and FIG. 17B, there may be multiple interchangeable inserts; for instance, at least an insert 1640 may include at least a first insert and at least second insert, where the first and second inserts are interchangeable. At least a second insert may have any material composition described for at least a first insert. As a non-limiting example, at least a second insert may include a second proportion of a first material, the second proportion differing from the first proportion. At least a second insert and at least a first insert may be combined in any configuration by users. As a non-limiting example, a user may need greater rigidity on outer sides of skis owing to the user's skiing style, and may place inserts having greater rigidity there, while a lesser degree of rigidity may be desired for inner sides of the skis, resulting in insertion of a more flexible insert. Since skis are frequently of symmetrical construction so that either ski may be used on either side, interchangeable inserts make it possible for a user to customize his or her skis to exhibit asymmetric properties to complement the user's tendencies.

Now with reference to FIGS. 16A and 17A, snow sliding device 1600 as described furnishes various advantages over other snow sliding devices. Through the use or omission of the various possible inserts, a user may modify the properties of snow sliding device to match varying conditions. For instance, lighter inserts (or no inserts at all), resulting in a lighter ski, may be used for light powder, while heavier inserts may be installed for skis with more heft to deal with densely packed snow. Inserts incorporating non-Newtonian material may be added to dampen vibration or "chatter" under conditions where chatter is a heightened concern, such as granular or icy slopes; note that snow sliding device 1600 may include non-Newtonian material in any other element of snow sliding device 1600, for instance as described above for manufacture of snow sliding devices in reference to FIG. 1. Users may vary properties from one side of snow sliding device to another, to account, for instance, for a user's tendency to put more pressure on outer or inner edges, requiring greater rigidity, vibration control, or strength on those edges. Users may vary properties from one end to another of snow sliding device, accounting for different vibration-damping, rigidity, or weighting needs at different sections or points of snow sliding device 1600; user may, as one non-limiting example, notice greater vibration at some point along snow sliding device 1600 and insert a insert section having greater proportions of dilatant material to suppress vibration at that point.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of manufacturing a snow sliding device, the method comprising:
    forming a core, wherein forming the core further comprises:
        forming a core body including an outer surface including an upper surface and a lower surface, the core body including a first thickness defining a first vertical distance from at least a first point on the upper surface to a corresponding at least a first point on the lower surface;
        shaping the core body to include the first thickness and a second thickness, the second thickness defining a second vertical distance from at least a second point on the upper surface to a corresponding at least a second point on the lower surface;
    providing a plurality of elements, wherein the plurality of elements includes:
        a base having a sliding surface;
        a top surface;
        a first reinforcement layer above the core and a second reinforcement layer below the core; and
        a first sidewall, including a first void, on a first side of the core and a second sidewall, including a second void, on a second side of the core, wherein the first sidewall and the second sidewall space the first reinforcement layer and the second reinforcement layer from one another; and
    incorporating in at least one of the core and the plurality of elements a first material, the first material exhibiting a shear rate-dependent shear resistance, wherein incorporating the first material further comprises incorporating the first material into the first void and the second void; and
    combining the plurality of elements to the core.

2. The method of claim 1, wherein incorporating the first material further comprises installing a fluid-impermeable barrier around the first material.

3. The method of claim 1, wherein incorporating the first material further comprises installing at least a buffer element with the first material.

4. The method of claim 1, wherein incorporating the first material further comprises incorporating the first material in the core.

5. The method of claim 4, wherein forming the core further comprises forming the core from the first material.

6. The method of claim 5, wherein forming the core further comprises molding the first material to form the core.

7. The method of claim 1, further comprising sealing an interior surface of at least one of the first void and the second void with a fluid-impermeable seal.

8. The method of claim 1, further comprising a step of sealing any area of the at least one of the first void and second void not occupied by the first material.

9. The method of claim 1, further comprising securing the first material in at least one of the first void and the second void.

10. The method of claim 9, wherein securing the first material further comprises adhering the first material to an interior surface of at least one of the first void and the second void.

11. The method of claim 1, wherein incorporating the first material further comprises incorporating the first material in the base.

12. The method of claim 11, wherein incorporating the first material in the base further comprises:
forming at least a third void in a surface of the base; and
inserting first material in the at least a third void in the surface of the base.

13. The method of claim 1, wherein incorporating the first material further comprises incorporating at least a layer of the first material in the plurality of elements.

14. The method of claim 1, wherein incorporating the first material further comprises incorporating the first material in at least an elastomeric strip.

15. The method of claim 1, wherein incorporating the first material further comprises incorporating the first material in a layer between the core and the base.

16. The method of claim 1 further comprising installing at least an end spacer adjacent to a terminal surface of the core body.

17. The method of claim 16 further comprising incorporating the first material in the at least an end spacer.

18. The method of claim 16 further comprising:
forming at least a third void in the at least an end spacer; and
inserting the first material in the at least a third void in the at least an end spacer.

19. The method of claim 1, wherein at least one of the first reinforcement layer and the second reinforcement layer comprises a layer of carbon fiber or graphene.

20. The method of claim 19, wherein at least one of the first reinforcement layer and the second reinforcement layer comprises a layer of textile.

21. The method of claim 1, wherein at least one of the first reinforcement layer and the second reinforcement layer comprises a reinforcing layer formed from aluminum and textured with titanium.

22. The method of claim 1, wherein the first material incorporated into the first void and the second void comprises a first insert and a second insert, respectively, each of which is slidably removable from a respective one of the first void and the second void.

* * * * *